(12) United States Patent
Dunjic et al.

(10) Patent No.: US 11,935,025 B2
(45) Date of Patent: Mar. 19, 2024

(54) REAL-TIME DELEGATED APPROVAL OF INITIATED DATA EXCHANGES BY NETWORK-CONNECTED DEVICES

(71) Applicant: The Toronto-Dominion Bank, Toronto (CA)

(72) Inventors: Milos Dunjic, Oakville (CA); Perry Aaron Jones Haldenby, Toronto (CA); Arthur Carroll Chow, Markham (CA); David Samuel Tax, Toronto (CA); John Jong-Suk Lee, Toronto (CA); Arun Victor Jagga, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 2 days.

(21) Appl. No.: 17/399,150

(22) Filed: Aug. 11, 2021

(65) Prior Publication Data

US 2021/0374708 A1    Dec. 2, 2021

Related U.S. Application Data

(63) Continuation of application No. 15/831,149, filed on Dec. 4, 2017, now Pat. No. 11,126,988.

(51) Int. Cl.
*G06Q 20/20* (2012.01)
*G06Q 20/10* (2012.01)
*G06Q 20/22* (2012.01)
*G06Q 20/40* (2012.01)

(52) U.S. Cl.
CPC .......... *G06Q 20/202* (2013.01); *G06Q 20/10* (2013.01); *G06Q 20/229* (2020.05); *G06Q 20/40* (2013.01); *G06Q 20/405* (2013.01)

(58) Field of Classification Search
CPC .. G06Q 20/367; G06Q 20/10; G06Q 20/2295; G06Q 20/202; G06Q 20/229; G06Q 20/40; G06Q 20/405
See application file for complete search history.

(56) References Cited

U.S. PATENT DOCUMENTS

| 7,835,942 | B1 | 11/2010 | Pavlic et al. |
| 8,014,756 | B1 | 9/2011 | Henderson |
| 2007/0017976 | A1* | 1/2007 | Peyret ................. G07F 7/1008 235/380 |
| 2007/0244811 | A1* | 10/2007 | Tumminaro ............ H04W 4/02 705/39 |

(Continued)

*Primary Examiner* — Allen C Chein
(74) *Attorney, Agent, or Firm* — Duane Morris LLP

(57) ABSTRACT

The disclosed embodiments include computer-implemented systems, apparatuses, and processes that perform a real-time delegated approval of initiated data exchanges by network-connected devices. For example, an apparatus determines determine a value of a parameter that characterizes an exchange of data and a first data type involved in the data exchange, and generates and transmits a first signal to a communications device associated with a second data type available for use in the data exchange and associated with the first data type. The apparatus receives, from the communications device, a second signal that includes information indicative of an approval of the second data type for use in the data exchange, and in response to the received approval, the apparatus performs the data exchange using the second data type and in accordance with the parameter value.

21 Claims, 8 Drawing Sheets

(56) References Cited

U.S. PATENT DOCUMENTS

| | | | |
|---|---|---|---|
| 2011/0302012 A1* | 12/2011 | Duroux | G06Q 30/0215 705/14.17 |
| 2012/0330764 A1 | 12/2012 | Nahidipour | |
| 2012/0330784 A1* | 12/2012 | Nahidipour | G06Q 20/20 705/26.1 |
| 2013/0030934 A1* | 1/2013 | Bakshi | G06Q 20/3224 705/18 |
| 2013/0103574 A1 | 4/2013 | Conrad et al. | |
| 2014/0258010 A1 | 9/2014 | Mardikar et al. | |
| 2015/0019427 A1 | 1/2015 | Murphy et al. | |
| 2015/0039519 A1 | 2/2015 | Mattsson et al. | |
| 2015/0206116 A1* | 7/2015 | Bess | G06Q 20/202 705/21 |
| 2016/0019536 A1 | 1/2016 | Ortiz et al. | |
| 2016/0342992 A1* | 11/2016 | Lee | G06Q 20/367 |
| 2017/0017958 A1 | 1/2017 | Scott et al. | |
| 2017/0075724 A1 | 3/2017 | Bentley | |

* cited by examiner

REAL-TIME DELEGATED APPROVAL OF INITIATED DATA EXCHANGES BY NETWORK-CONNECTED DEVICES

CROSS-REFERENCE TO RELATED APPLICATION

This application is a continuation of, and claims the benefit of priority to, U.S. application Ser. No. 15/831,149, filed Dec. 4, 2017, the disclosure of which is expressly incorporated herein by reference to its entirety.

TECHNICAL FIELD

The disclosed embodiments generally relate to computer-implemented systems and processes that delegate approvals of initiated data exchanges to network-connected devices.

BACKGROUND

Today, payment systems and related technologies continuously evolve in response to advances in payment instruments, such as the ongoing transition from physical transaction cards to digital payment instruments maintained on mobile devices. These innovations result in additional mechanisms for submitting payment to an electronic or physical merchant and for flexibly funding transactions initiated by the electronic or physical merchant

SUMMARY

In one example, an apparatus includes a communications unit, a storage unit storing instructions, and at least one processor coupled to the communications unit and the storage unit. The at least one processor is configured to execute the instructions to determine a value of a parameter that characterizes an exchange of data and a first data type involved in the data exchange, and generate and transmit, via the communications unit, a first signal to a communications device associated with a second data type available for use in the data exchange. The second data type is associated with the first data type, and the at least one processor is further configured to execute the instructions to receive a second signal from the communications device via the communications unit. The second signal includes information indicative of an approval of the second data type for use in the data exchange. In response to the received approval, the at least one processor is further configured to execute the instructions to perform the data exchange using the second data type and in accordance with the parameter value.

In other examples, a computer-implemented method includes determining, by at least one processor, a value of a parameter that characterizes an exchange of data and a first data type involved in the data exchange, and generating and transmitting, by the at least one processor, a first signal to a communications device associated with a second data type available for use in the data exchange. The second data type is associated with the first data type, and the method also includes receiving, by the at least one processor, a second signal from the communications device. The second signal includes information indicative of an approval of the second data type for use in the data exchange. In response to the received approval, the method also includes performing, by the at least one processor, the data exchange using the second data type and in accordance with the parameter value.

Further, in some examples, an apparatus includes a communications unit, a storage unit storing instructions, and at least one processor coupled to the communications unit and the storage unit. The at least one processor is configured to execute the instructions to determine a first data type involved in a data exchange initiated at a terminal device, and generate and transmit a first signal to the terminal device via the communications unit. The first signal includes status data that reflects a pending performance of the data exchange using a second data type, and the second data type is available for use in the data exchange and associated with the first data type. The at least one processor is further configured to execute the instructions to receive, via the communications unit, a second signal from a communications device associated with the second data type. The second signal includes information indicative of an approval of the second data type for use in the data exchange, and in response to the received approval, the at least one processor is further configured to execute the instructions to generate and transmit a third signal to the terminal device via the communications unit. The third signal includes modified status data reflecting a performance of the initiated data exchange using the second data type, and the third signal further includes further information that instructs the terminal device to modify local status data to reflect the modified status data.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

DETAILED DESCRIPTION

Figure 1:
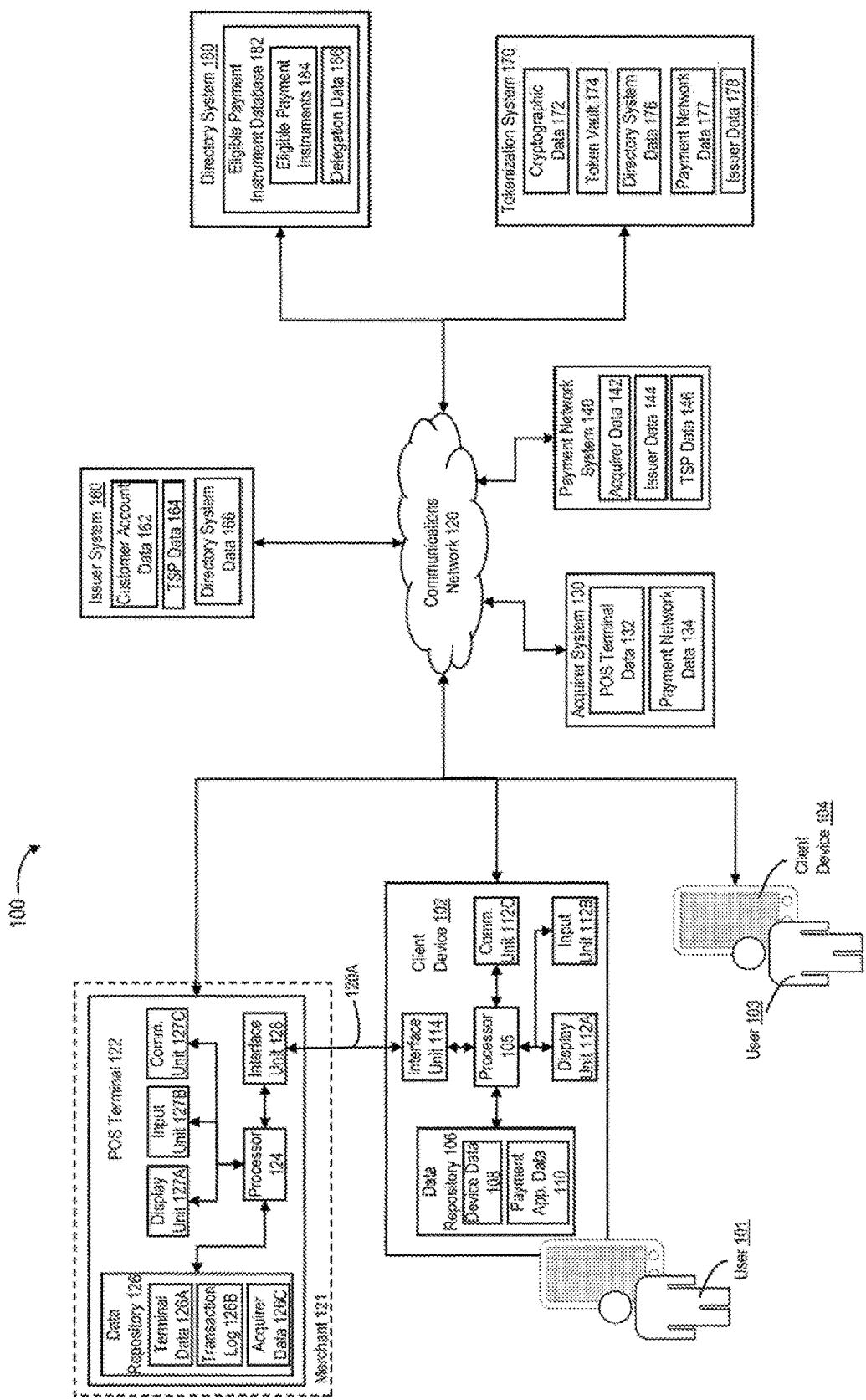
FIG. 1 is a diagram of an exemplary computing environment, consistent with disclosed embodiments.

Reference will now be made in detail to the disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the described subject matter.

This specification describes exemplary computer-implemented apparatuses, devices, and processes that, among other things, perform operations that initiate, approve, and execute exchanges of data between network-connected devices operating in a computing environment. Further, and as described below, these exemplary apparatus, devices, and processes can also perform operations that dynamically delegate an approval of an initiated data exchange to one or more network-connected devices based on determined inconsistencies between contextual data characterizing the initiated data exchange and a delegation criterion.

In some aspects, described herein, a network-connected computing system may receive, through a corresponding communications unit, a signal that includes information identifying an exchange of data. The data exchange may, for example, be initiated at a network-connected terminal device, and based on the received signal, the computing system may determine a value of a parameter that characterizes the data exchange of data and a first data type involved in the data exchange. The computing system may further identify a second data type that is associated with the first data type and further, available for use in the data exchange, and may generate and transmit, via the communications unit, an additional signal to a communications device associated with the second data type available for use in the data exchange. The additional signal may, in some instances, include information that instructs an application program executed by the communications device to present a representation of the parameter value and/or the second data type on an interface, such as a graphical user interface (GUI).

For example, the presented representation may prompt a user of the communications device, e.g., an "approving party," to approve a performance of the initiated data exchange using the second data type and in accordance with the parameter value. In some instances, the user may provide input to the communications device (e.g., through a corresponding input unit) specifying an approval of the performance of the initiated data exchange, and the computing system may receive a signal from the communications device that indicates the user's approval of the second data type for use in the data exchange. In response to the received approval, the computing system may perform the data exchange using the second data type and in accordance with the parameter value.

Additionally, and prior the receipt of the user's approval, the computing system may also generate and transmit, to the terminal device, status data that reflects a pending performance of the data exchange using the second data type. The status may, in some instances, cause the terminal device to modify locally stored status data (e.g., as associated with a unique identifier of the initiated data exchange within a tangible, non-transitory memory) to reflect the pending performance of the initiated data exchange. Further, and in response to the received approval from the user, the computing system may also generate and transmit modified status data to the terminal device. The modified status data may reflect the performance of the initiated data exchange using the second data type, and the terminal device may further modify portions of the locally stored status data to reflect the modified status of the initiated transaction.

In one example, the terminal device may correspond to a network-connected point-of-sale (POS) terminal associated with a merchant, and the initiated data exchange may facilitate an approval and an execution of a transaction initiated at terminal device by a client device. The initiated transaction may, in some instances, correspond to a purchase transaction in which a customer (e.g., that operates the client device) purchases a good or service from the merchant at an agreed-upon price (e.g., a transaction amount), and the parameter values charactering the initiated transaction may include, but are not limited to, the transaction amount, data identifying the customer or the merchant, data identifying the purchased good or service, or a time or date associated with the initiated transaction.

Further, the customer may operate the client device, and in response to input provided to the client device by the customer (e.g., through a corresponding input unit), the executed application program may cause the client device to transmit data identifying the payment instrument (e.g., as provisioned to the client device) to the POS terminal across the direct communications channel. In some example, the payment instrument can include, but is not limited to, a credit or debit card account held by the customer and issued by one or more financial institutions (e.g., issuers), a checking or savings account held by the customer at one or more financial institutions, an electronic funds transfer (e.g., e-transfers), and other accounts held by or available to the customer and capable of funding the purchase transaction.

I. Exemplary Computing Environments

FIG. 1 is a diagram illustrating an exemplary computing environment 100, consistent with certain disclosed embodiments. As illustrated in FIG. 1, environment 100 may include a client device 102 (of a user 101), a client device 104 (of a user 103), a point-of-sale (POS) terminal 122, an acquirer system 130, a payment network system 140, an issuer system 160, a tokenization system 170, and a directory system 180, each of which may be interconnected to through any appropriate combination of wired and/or or wireless communications networks, such as network 120. Examples of network 120 include, but are not limited to, a wireless local area network (LAN), e.g., a "Wi-Fi" network, a network utilizing radio-frequency (RF) communication protocols (e.g., a cellular network), a Near Field Communication (NFC) network, a wireless Metropolitan Area Network (MAN) connecting multiple wireless LANs, and a wide area network (WAN), e.g., the Internet.

Further, as illustrated in FIG. 1, client device 102 and POS terminal 122 may exchange data across a direct channel of communications, e.g., direct communication channel 120A. In one aspect, direct communications channel 120A may correspond to a wireless communications channel established across a short-range communications network, examples of which include, but are not limited to, a wireless LAN, e.g., a "Wi-Fi" network, a network utilizing RF communication protocols, a NFC network, a network utilizing optical communication protocols, e.g., infrared (IR) communications protocols, and any additional or alternate communications network, such as those described above, that facilitate peer-to-peer (P2P) communication between POS terminal 122 and client device 102.

POS terminal 122 may, in some instances, be associated with a merchant, e.g., merchant 121, and client device 102 may be associated with or operated by a customer of merchant 121, e.g., user 101 (further, as illustrated in FIG. 1, client device 104 may be operated by user 103). For example, POS terminal 122 may be disposed within a physical location of merchant 121, such as a location where a customer, e.g., user 101, provides payment for goods and/or services (e.g., at a cash register at merchant 121). In one aspect, client device 102 may correspond to a consumer payment device that, upon establishing communication with POS terminal 122 across communications channel 120A, provides data to POS terminal 122 specifying a payment instrument available for use in an initiated transaction for the goods and/or services.

The payment instrument may, in some instances, be issued to user by a financial institution, e.g., a financial institution that operates issuer system 160, and issuer system 160 may perform operations that provide the executable payment application to client devices 102 for storage within the one or more tangible, non-transitory memories. Payment instruments consistent with the disclosed embodiments include, but are not limited to, a credit or debit card accounts held by user 101, an account that includes units of one or more digital currencies held by user 101, a checking or savings account held by user 101 at one or more financial institutions, an electronic funds transfer, and/or other accounts held by or available to user 101 and capable of funding purchase transaction initiated at POS terminals operating within environment 100, such as POS terminal 122.

Client device 102 is described below. It should be understood that unless otherwise indicated this description applies equally to client device 104 and to other client devices operating within environment 100, each which includes components similar in structure and functionality to those described herein in reference to client device 102. Further, the description of user 101, as set forth below, may also apply to user 103 and to operators of other client devices within environment 100.

In some embodiments, client device 102 may include a computing device having one or more tangible, non-transitory memories that store data and/or software instructions, and one or more processors, e.g., processor 105 configured to execute the software instructions. The one or more tangible, non-transitory memories may, in some aspects, store software applications, application modules, and other elements of code executable by the one or more processors, such as a web browser, an application associated with issuer system 160 (e.g., a mobile application), and additionally or alternatively, a payment application associated with a payment service (e.g., a mobile application that establishes and maintains a mobile wallet), as described below.

Client device 102 may also establish and maintain, within the one or more tangible, non-transitory memories, one or more structured or unstructured data repositories or databases, e.g., data repository 106, that include device data 108 and payment application data 110. In one instance, device data 108 may include data that uniquely identifies client device 102, such as a media access control (MAC) address of client device 102 or an IP address assigned to client device 102.

Further, in additional instances, payment application data 110 may include one or more identifiers of the payment application (e.g., a wallet address assigned to the mobile wallet established and maintained by the executed payment application), data identifying one or more payment instruments available to the executed payment application (e.g., tokenized data or cryptograms representative of the payment instruments provisioned to the established mobile wallet), and additional data supporting an operation of the executed payment application (e.g., a mobile wallet cryptogram provided to POS terminal 122 to validate the established mobile wallet, etc.). The disclosed embodiments are, however, not limited to these examples of device and payment application data, and in further aspects, data repository 106 may include any additional or alternate data appropriate to client device 102 and the executed payment application.

Client device 102 may also include a display unit 112A configured to present interface elements to user 101, and an input unit 112B configured to receive input from user 101, e.g., in response to the interface elements presented through display unit 112A. By way of example, display unit 112A may include, but is not limited to, an LCD display unit or other appropriate type of display unit, and input unit 112B may include, but input not limited to, a keypad, keyboard, touchscreen, voice activated control technologies, or appropriate type of input unit. Further, in additional aspects (not depicted in FIG. 1), the functionalities of display unit 112A and input unit 112B may be combined into a single device, e.g., a pressure-sensitive touchscreen display unit that presents interface elements and receives input from user 101. Client device 102 may also include a communications unit 112C, such as a wireless transceiver device, coupled to processor 105 and configured by processor 105 to establish and maintain communications with network 120 using any of the communications protocols described herein.

Further, in some aspects, client device 102 may include an interface unit 114, which can be configured by processor 105 to establish and maintain communications with POS terminal 122 (e.g., through interface unit 128 of FIG. 1) across communications channel 120A. For example, each of interface unit 114 and interface unit 128 may include a communications device, e.g., a wireless transceiver device, capable of exchanging data across communications channel 120A using any of the short-range communications protocols described above (e.g., NFC protocols, RF communications protocols, Bluetooth™ communication protocols, optical communications protocols, etc.). In other examples, interface unit 114 may include one or more electrical connectors capable of engaging with corresponding electrical connectors of interface unit 128 of POS terminal 122, or an electrical connector capable receiving a wired connection with POS terminal 122 (e.g., a USB connector, etc.).

Examples of client device 102 may include, but are not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations, and/or display information on an interface module, consistent with disclosed embodiments. In some instances, user 101 may operate client device 102 and may do so to cause client device 102 to perform one or more operations consistent with the disclosed embodiments.

POS terminal 122 may correspond to a computing device that includes one or more tangible, non-transitory memories storing data and/or software instructions, and one or more processors, e.g., processor 124, configured to execute the software instructions. The one or more tangible, non-transitory memories may, in some aspects, store software applications, application modules, and other elements of code, which when executed by the one or more processors, cause POS terminal 122 to perform operations consistent with the disclosed embodiments, as described below. Further, in certain aspects, POS terminal 122 may also store and maintain a data repository, e.g., data repository 126, within the one or more tangible, non-transitory memories. Data repository 126 may, for example, include terminal data 126A that uniquely identifies POS terminal 122 within network 120, a transaction log 126B that identifies transactions initiated at POS terminal 122 and authorized using any of the exemplary processes described herein, and/or acquirer data 126C that uniquely identifies a computing system (e.g., a MAC address, an IP address, etc.) of an entity, e.g., an acquirer, that administers POS terminal 122 and other POS terminals operating in environment 100.

As described above, POS terminal 122 may be disposed within a physical location of the merchant, such as a location where a customer, such as user 101, may provide payment for goods and/or services (e.g., at a cash register at the merchant). POS terminal 122 may, in some instances, include a display unit 127A configured to present interface elements to user 101, and an input unit 127B configured to receive input from user 101, e.g., in response to the interface elements presented through display unit 127A. By way of example, display unit 127A may include, but is not limited to, an LCD display unit or other appropriate type of display unit, and input unit 127B may include, but input not limited to, a keypad, keyboard, touchscreen, voice activated control technologies, or appropriate type of input unit. Further, in additional aspects (not depicted in FIG. 1), the functionalities of display unit 127A and input unit 127B may be combined into a single device, e.g., a pressure-sensitive touchscreen display unit that presents interface elements and receives input from user 101 or user 103.

POS terminal 122 may also include a communications unit 127C, such as a wireless transceiver device, coupled to processor 124 and configured by processor 124 to establish and maintain communications with network 120 using any of the communications protocols described herein. Further, POS terminal 122 may include an interface unit 128, which may be configured by processor 124 to establish and maintain communications with client device 102 (e.g., through interface unit 114 of FIG. 1) across communications channel 120A. In some aspects, interface unit 128 may include a communications device, such as a wireless transceiver device, capable of exchanging data with client device 102 using any of the short-range communications protocols described above (e.g., NFC protocols, RF communications protocols, Bluetooth™ communication protocols, optical communications protocols, etc.).

Examples of POS terminal 122 may include, but are not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations consistent with disclosed embodiments. Further, although not depicted in FIG. 1, POS terminal 122 may also be coupled to a computing system associated with and maintained by merchant 121 (e.g., a cash register, etc.), which may include one or more processors and one or more tangible, non-transitory memories storing one or more software applications, application modules, and other elements of code that, when executed by the one or more processors, cause the merchant computing system to exchange data with POS terminal 122 and perform operations consistent with the disclosed embodiments.

The disclosed embodiments are not limited to such POS terminals, and in additional aspects, POS terminal 122 may correspond to one or more application program modules executed by a computing system maintained by merchant 121, one or more computing systems operating within environment 100, one or more client devices operating within environment 100, such as client device 102 or 104. In other embodiments, POS terminal 122 may represent a device communicatively coupled to client device 102 to provide mobile point-of-sale services, such as a Square™ device in communication with client device 102.

Referring back to FIG. 1, acquirer system 130, payment network system 140, issuer system 160, tokenization system 170, and directory system 180 may each represent a computing system that includes one or more servers (e.g., not depicted in FIG. 1) and tangible, non-transitory memory devices storing executable code and application modules. Further, the servers may each include one or more processor-based computing devices, which may be configured to execute portions of the stored code or application modules to perform operations consistent with the disclosed embodiments, including operations consistent with the exemplary transaction authorization and delegated pay processes described herein.

In other instances, and consistent with the disclosed embodiments, one or more of acquirer system 130, payment network system 140, issuer system 160, tokenization system 170, and directory system 180 may correspond to a distributed system that includes computing components distributed across one or more networks, such as network 120, or other networks, such as those provided or maintained by cloud-service providers. In further aspects, one or more of acquirer system 130, payment network system 140, issuer system 160, tokenization system 170, or directory system 180 can be incorporated into a single computing system, as described herein.

In some aspects, acquirer system 130 may perform operations that administer one or more POS terminals operating within environment 100, such as POS terminal 122. As illustrated in FIG. 1, acquirer system 130 may maintain, within the one or more tangible, non-transitory memories, POS terminal data 132 that identifies one or more of the POS terminals administered by acquirer system 130 (e.g., an IP address, MAC address, or other unique device identifier of POS terminal 122), and payment network data 134 that identifies one or more payment networks capable of clearing and settling purchase transactions initiated by POS terminals administered by acquirer system 130 (e.g., an IP address or other identifier of payment network system 140).

Payment network system 140 may perform operations that clear and settle authorized purchase transactions using one or more exemplary purchase transaction clearance and settlement processes. In certain aspects, and to facilitate a performance of these exemplary clearance and settlement processes, payment network system 140 may maintain acquirer data 142, issuer data 144, and tokenization service provider (TSP) data 146 within the one or more tangible, non-transitory memories. Acquirer data 142 may include data that uniquely identifies one or more acquirer computing systems that administer POS terminals operating within environment 100 (e.g., an IP address, MAC address, or other unique identifier of acquirer system 130). Further, in some instances, issuer data 144 may include data that uniquely identifies computing systems maintained by one or more issuers of payment instruments involved in purchase transactions initiated at POS terminal 122 (e.g., an IP address, MAC address, or other unique identifier of issuer system 160).

In additional instances, TSP data 146 may include information that uniquely identifies a network-connected computing system associated with one or more tokenization service providers operating within environment 100. For example, and as described herein, tokenization system 170 may provide tokenization services to payment network system 140 and additionally or alternatively, to issuer system 160, and TSP data may include an IP address, a MAC address, or another unique identifier of tokenization system 170 within a corresponding communications network, such as network 120.

In some aspects, tokenization system 170 may, upon execution of stored software instructions, perform operations that provide tokenization services to payment network system 140 and additionally or alternatively, to issuer system 160. As illustrated in FIG. 1, and to facilitate the provision of these exemplary tokenization services, tokenization system 170 may maintain, within one or more tangible non-transitory memories, cryptographic data 172 and a token vault 174. Cryptographic data 172 may, in some instances, specify one or more private, public, or symmetric cryptographic keys capable of decrypting one or more authorization requests selectively encrypted by POS terminal 122. Further, in additional instances, token vault 174 may include structured data records that include tokenized data assigned to one or more payment instruments held by user 101 (and users of other client devices and payment devices operating within environment 100) and further, that associate the tokenized data with account numbers, expiration dates, card verification values, and other sensitive account data that facilitate an authorization, by issuer system 160, of purchase transactions involving these payment instruments.

Further, tokenization system 170 may also maintain, within the one or more tangible, non-transitory memories, directory system data 176 that identifies one or more network-connected computing systems, such as directory system 180, that maintain directories of payment instruments participating in the exemplary delegated payment processes described herein. In some instances, directory system data 176 may include data that identifies a unique network address of directory system 180 within network 120 (e.g., an IP address, a MAC address, or other unique network address) and additionally or alternatively, data identifying a programmatic interface that facilitates secure application-to-application communication between application modules executed by tokenization system 170 and directory system 180. Tokenization system 170 may also maintain, within the one or more tangible, non-transitory memories, payment network data 177 and issuer data 178 which include data uniquely identifying respective ones of issuer systems and payment network systems operating within environment 100 (e.g., an IP address, MAC address, or other unique identifier of issuer system 160 or payment network system 140).

Issuer system 160 may maintain, within the one or more tangible, non-transitory memories, data that facilitates an authorization of purchase transactions initiated at POS terminals operating within environment 100 and involving issued payment instruments available to user 101, e.g., as specified by data provided to POS terminal 122 by client device 102 across communications channel 120A. For example, as illustrated in FIG. 1, issuer system 160 may maintain customer account data 162 that identifies underlying accounts (e.g., account numbers, expiration dates, card verification values, etc.) associated with each of the payment instruments issued by issuer system 160 and tokenization service provider (TSP) data 164 that identifies a network-connected computing system associated with one or more tokenization service providers operating within environment 100.

Issuer system 160 may also maintain, within the one or more tangible, non-transitory memories, directory system data 166 that identifies one or more network-connected computing systems, such as directory system 180, that maintain directories of payment instruments participating in the exemplary delegated payment processes described herein. As described herein, directory system data 166 may include data that identifies a unique network address of directory system 180 within network 120 (e.g., an IP address, a MAC address, or other unique network address) and additionally or alternatively, data identifying a programmatic interface that facilitates secure application-to-application communication between application modules executed by issuer system 160 and directory system 180.

Directory system 180 may maintain, within one or more tangible, non-transitory memories, data that facilitates any of the delegated approval processes described herein. By way of example, as illustrated in FIG. 1, directory system 180 may establish and maintain an eligible payment instrument database 182 having data records 184 that identify each payment instrument eligible to participate in the delegated approval processes (e.g., tokenized payment data or actual account information) and that associate each eligible payment instrument with corresponding portions of delegation data 186. In some instances, delegation data 186 may include, for each of the eligible payment instrument, a unique identifier of a corresponding approving party, contact information and preferences for that approving party (e.g., a preference to receive text messages and a corresponding mobile telephone number), and data identifying a payment instrument capable of funding an initiated transaction approved by the approving party (e.g., tokenized account information characterizing an available payment instrument, actual account information, etc.).

In further instances, delegation data 186 may also include, for one or more of the eligible payment instruments, at least one delegation criterion that, when detected by issuer system 160 or tokenization system 170, trigger an implementation of any of the delegated payment processes described herein. Examples of delegation criteria include, but are not limited to, a threshold transaction amount for an initiated transaction, a transaction velocity condition, ranges of transaction dates or times or an occurrence of a transaction involving a specified good or service, or involving a specified merchant. The delegation criteria could also be tied to the absence of a specific criterion, such as the threshold transaction amount, which would trigger delegation for every initiated transaction.

II. Exemplary Computer-Implemented Processes for Dynamically Delegating Approvals of Initiated Data Exchanges to Network-Connected Devices In some embodiments, a client device, e.g., client device 102, may perform operations that initiate an exchange of data with a network-connected device, such as POS terminal 122, across a direct channel of communications, e.g., communications channel 120A. The initiated data exchange may be characterized by a value of one or more data-exchange parameters, and POS terminal 122, in conjunction with acquirer system 130, payment network system 140, issuer system 160, and tokenization system 170, and/or directory system 180 may perform any of the exemplary processes described herein to delegate an approval of the initiated data exchange to a third-party (e.g., an "approving" party), and based on an outcome of the delegation, to authorize a performance of the initiated data exchange in accordance with the values of the one or more data-exchange parameters.

In some aspects, and as described herein, the exchange of data initiated between client device 102 and POS terminal 122 (e.g., across direct communications channel 120A) may correspond to a purchase transaction initiated at POS terminal 122 by a customer of merchant 121, e.g., user 101. A computing system maintained by merchant 121 (e.g., a cash register) may obtain transaction data characterizing the initiated transaction, such as an identifier of the product or products involved in the transaction (e.g., a universal product code (UPC) assigned to the product) and the corresponding transaction amount, and provide the obtained transaction data to POS terminal 122 across any appropriate wired or wireless connection.

POS terminal 122 may receive the transaction data from the merchant computing system, and may perform operations that generate interface elements representative of portions of the received transaction data, which POS terminal 122 may present within a graphical user interface (GUI) displayed on display unit 127A. In response to the presented interface elements, which may prompt user 101 to provide a payment instrument capable of funding the transaction amount of the initiated transaction, user 101 may dispose client device 102 proximate to POS terminal 122, and interface unit 114 of client device 102 may establish communications channel 120A with POS terminal 122 (e.g., through the communications device included within interface unit 128 of POS terminal 122 using any of the short-range, wireless communication protocols described above). Processor 105 of client device 102 may execute a payment application (e.g., a mobile wallet application) that causes client device 102 to present, to user 101 through display unit 112A, interface elements that identify one or more payment instruments maintained within a mobile wallet established by the executed payment application and available to fund the initiated transaction.

By way of example, user 101 may elect to purchase a sweater from merchant 121 (e.g., a Nordstrom™ department store in Washington, D.C.) for an agreed-upon price of $50.00 (e.g., the transaction amount). Further, in some examples, user 101 may select to fund the initiated transaction with an available Visa™ credit card. As described herein, user 101 may represent an "originator" of the initiated transaction involving merchant 121 (e.g., and may be referred to as an "originating party"), and the Visa™ credit card selected by user 101 may corresponding to an "originator" payment instrument available to fund the initiated transaction. Further, in some aspects, the originator payment instrument may be eligible to participate in one or more of the exemplary delegated approval processes described herein.

Figure 2A:
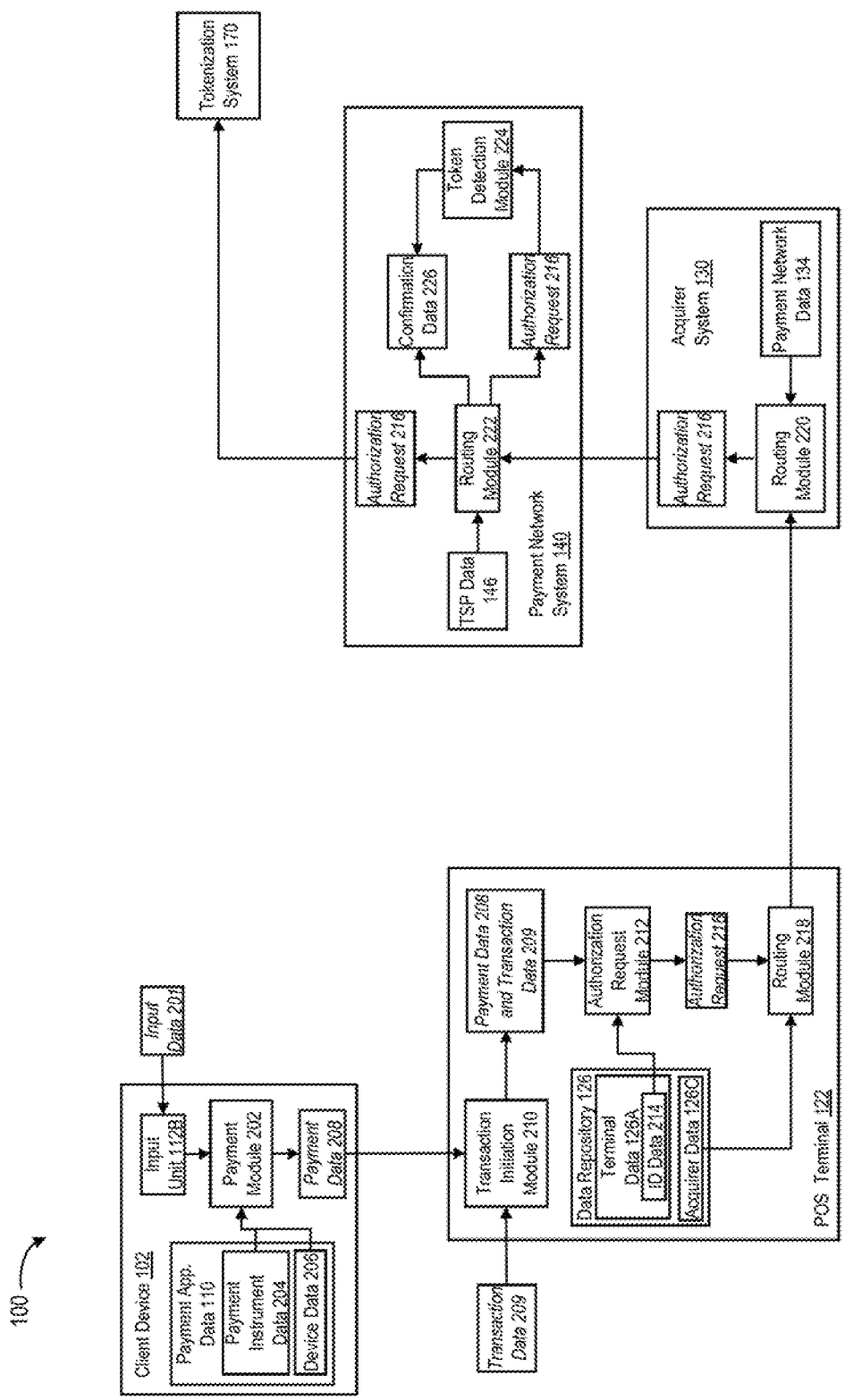
FIGS. 2A, 2B, 2C, and 3A are diagrams illustrating portions of an exemplary computing environment, consistent with the disclosed embodiments.

Referring to FIG. 2A, a payment module 202 of client device 102 may receive, through input unit 112B, input data 201 that identifies the payment instrument selected by user 101 to fund the initiated transaction (e.g., the originator payment instrument). Payment module 202 may process input data 201 to obtain an identifier of the originator payment instrument, and based on the obtained identifier, perform operations that access and load a portion of payment application data 110 that corresponds to the originator payment instrument. For example, payment module 202 may access payment application data 110 (e.g., as maintained within data repository 106), and load payment instrument data 204 that identifies an account number, an expiration data, and/or a card verification value assigned to the originator payment instrument.

In some examples, payment instrument data 204 may include elements of sensitive data susceptible to exposure and compromise when transmitted between computing systems and devices operating within environment 100, e.g., across network 120 or direct communications channel 120A. To mitigate a risk of exposure or compromise, one or more of these sensitive data elements may be replaced within a non-sensitive representation of that data element, e.g., a token, having no extrinsic or exploitable meaning or value. For instance, the account number of the originator payment instrument (e.g., the Visa™ credit card), as maintained within payment application data 110 by payment module 202, may not correspond to the actual account number generated by issuer system 160, but may instead correspond to a tokenized representation of that account number generated by a tokenization service provider associated with issuer system 160 or payment network system 140, e.g., tokenization system 170 of FIG. 1.

Referring back to FIG. 2A, payment module 202 may perform additional operations that access and load, from corresponding portions of data repository 106, device data 206 that uniquely identifies client device 102 within network 120 (e.g., an IP address, a MAC address, a unique identifier of user 101, etc.). Payment module 202 may package portions of payment instrument data 204 and device data 206 into payment data 208, which client device 102 may transmit across communications channel 120A to POS terminal 122 using any of the short-range communications protocols outlined above. In some examples, not illustrated in FIG. 2A, payment data 208 may also include data that identifies and authenticates the mobile wallet established and maintained by payment module 202, such a mobile wallet token or a unique mobile wallet address.

A transaction initiation module 210 of POS terminal 122 may receive payment data 208 from client device 102, and further, may receive transaction data 209 from the merchant computing system, e.g., the cash register operated by merchant 121. Transaction data 209 may, for example, include data characterizing the initiated transaction, such as, but not limited to, an identifier of the product or products involved in the transaction (e.g., the UPC assigned to the purchased product) and the corresponding transaction amount. In some aspects, transaction initiation module 210 may provide portions of payment data 208 and transaction data 209 as an input to an authorization request module 212, which may perform any of the exemplary processes described herein to generate an authorization request for the initiated transaction.

For example, authorization request module 212 may receive payment data 208 and transaction data 209, and may perform additional operations that access and load data identifying POS terminal 122, e.g., terminal identification data 214, from a corresponding portion of data repository 126, e.g., from terminal data 126A. In some instances, terminal identification data 214 may include a unique network address of POS terminal 122 within network 120, such as an IP address or a MAC address. In other instances, terminal identification data 214 may include a POS cryptogram that uniquely identifies POS terminal 122, which may be generated and assigned to POS terminal 122 by payment network system 140.

Authorization request module 212 may perform operations that package payment data 208, transaction data 209, and terminal identification data 214 into an authorization request 216. As described herein, portions of the payment data 208 may include tokenized representations of sensitive account information (e.g., tokenized account numbers, expiration dates, card verification values, etc.), and in some aspects, authorization request 216 may correspond to a tokenized authorization request (e.g., an "authorization token") that further masks sensitive account, customer, and terminal data during transmission across network 120.

As illustrated in FIG. 2A, authorization request module 212 may provide authorization request 216 as an input to a routing module 218 of POS terminal 122. For example, routing module 218 may access and load a network address of acquirer system 130 from acquirer data 126C (e.g., the MAC address or the IP address of acquirer system 130). Further, routing module 218 may perform operations that transmit authorization request 216 across network 120 to the network address of acquirer system 130, e.g., through communications unit 127C using any of the communications protocols outlined above.

A routing module 220 of acquirer system 130 may receive authorization request 216 from POS terminal 122. In some examples, routing module 220 may access payment network data 134 and extract a network address of payment network system 140 (e.g., a MAC address or an IP address). In certain aspects, routing module 222 may transmit authorization request 216 across network 120 to the extracted network address of payment network system 140, e.g., using any of the communications protocols described above.

A routing module 222 of payment network system 140 may receive authorization request 216 from acquirer system 130, which received and relayed authorization request 216 from POS terminal 122. As described herein, authorization request 216 may correspond to a tokenized authorization request, and portion of the payment data that characterizes the originator payment instrument may be tokenized (e.g., authorization request 216 may include tokenized payment data corresponding to the originator payment instrument). In some aspects, payment network system 140 may receive authorization request 216, and a token detection module 264 of payment network system 140 may process authorization request 216 to detect a presence of the tokenized payment data. In response to the detection of the tokenized payment data, token detection module 264 may generate confirmation data 226, which indicates the detected presence of the tokenized payment data, and provide confirmation data 226 as an input to routing module 222.

Based on confirmation data 226, routing module 222 may access stored data identifying a network address of tokenization system 170 (e.g., TSP data 146), and may transmit the authorization request 216 to the network address of the tokenization system 170 through a corresponding API or other programmatic interface. In some aspects, and in additional to the tokenization services described herein, one or more application program modules, when executed by tokenization system 170, may cause tokenization system 170 to, among other things, intercept the initiated transaction and modify a status of the initiated transaction at POS terminal 122, and perform any of the exemplary processes described herein to delegate an approval of the initiated transaction to device operated by an approving party, and based on the delegated approval, to authorize the transaction using a payment instrument held by the approving party.

Figure 2B:
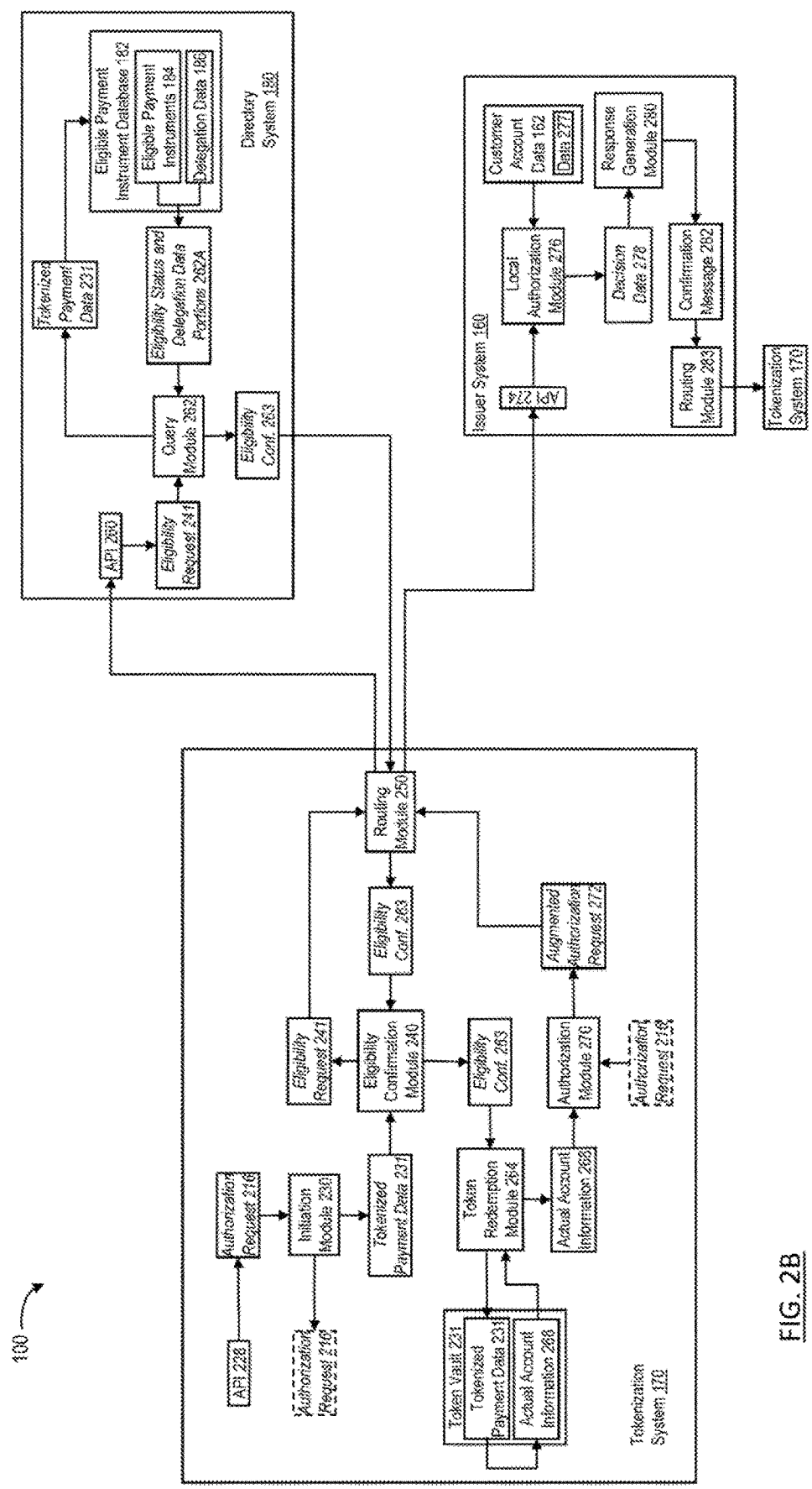

Referring to FIG. 2B, a programmatic interface of tokenization system 170, e.g., application programming interface (API) 228, may receive authorization request 216 and may provide authorization request 216 as an input to an initiation module 230. In some aspects, API 228 may be associated with or established by initiation module 230, and may facilitate secure, module-to-module communications across network 120 between routing module 222 of payment network system 140 and initiation module 230. Initiation module 230 may perform operations that store the authorization request 216 within a portion of a tangible, non-transitory memory, and may process authorization request 216 to extract tokenized payment data 231, which represents and masks sensitive account data associated with the originator payment instrument, and to provide tokenized payment data 231 as an input to an eligibility confirmation module 240.

Eligibility confirmation module 240 may perform operations that package tokenized payment data 231 into an eligibility request 241 for transmission across network 120 to directory system 180, which may establish and maintain a database identifying one or more payment instruments eligible to participate in the exemplary delegated approval processes described herein (e.g., eligible payment instrument database 182 of FIG. 1). For example, eligibility confirmation module 240 may provide eligibility request 241 as an input to a routing module 250, which may access and load a network address of directory system 180 from a tangible, non-transitory memory (e.g., from directory system data 166 of FIG. 1), and transmit eligibility request 241 across network 120 to the network address of directory system 180.

In some aspects, directory system 180 may receive eligibility request 241, e.g., through a corresponding programmatic interface, such as API 260, and API 260 may route eligibility request 241 to a query module 262 of directory system 180. For example, API 260 may be established by and associated with a query module 262 executed by directory system 180, and may facilitate secure, module-to-module communication across network 120 between routing module 250 and query module 262.

Query module 262 may perform operations that process eligibility request 241 and extract tokenized payment data 231 (and additionally or alternatively, actual account information representative of the originator payment instrument). In some instances, query module 262 may perform operations that query data records 184 of eligible payment instrument database 182 to determine whether the originator payment instrument is eligible to participate in the exemplary delegated approval processes described herein. For example, if the query module 262 were to identify one or more stored data records corresponding to tokenized payment data 231 (or alternatively, to corresponding actual account information), query module 262 may establish that the originator payment instrument is eligible to participate in the exemplary delegated approval processes (e.g., and is associated with a positive eligibility status), and may access and load portions 262A of delegation data 186 associated with the identified data records and thus, the originator payment instrument (e.g., the mobile telephone number of the approving party and/or the approving part's funding information along with corresponding delegation criteria). The query module 262 may package data indicative of the positive eligibility states and delegation data portions 262A, along with tokenized payment data 231 into an eligibility confirmation 263 (e.g., eligibility data).

In other examples if the query module 262 were unable to identify any of the stored data records that correspond to tokenized payment data 231 (or to the corresponding actual account information), query module 262 may determine that the originator payment instrument is not eligible to participate in the exemplary delegated approval processes described herein (e.g., and is associated with a negative eligibility status). Based on the determination, query module 262 may then generate eligibility confirmation 263 to indicate the eligibility status of the originator payment instrument.

Directory system 180 may, in some aspects, transmit eligibility confirmation 263 across network 120 to tokenization system 170, e.g., through a corresponding programmatic interface, such as an API established by, and associated with, routing module 250 (not shown in FIG. 2B). The established API may facilitate secure, application-to-application communication between routing module 250 and query module 262, and may provide eligibility confirmation 263 as an input to conformation module 240, e.g., through routing module 250. Eligibility confirmation module 240 may receive eligibility confirmation 263, and perform operations to determine the eligibility status of the originator payment instrument based on eligibility confirmation 263.

If confirmation module 240 determines from eligibility confirmation 263 that the originator payment instrument is not eligible to participate in the exemplary delegated approval processes (e.g., a "negative" eligibility status), tokenization system 170 and issuer system 160 perform operations to authorize the transaction using one or more conventional authorization protocols, such as those consistent with EMV transaction authorization protocols. For example, and responsive to negative eligibility status of the originator payment instrument, a token redemption module 264 of the tokenization system 170 may receive eligibility confirmation 263 from confirmation module 240, and perform operations that extract tokenized payment data 231 from eligibility confirmation 263.

Further, token redemption module 264 may access token vault 174 (e.g., as maintained within a tangible, non-transitory memory by tokenization system 170), and access and load actual account information 268 associated with tokenized payment data 231. An authorization module 270 of the tokenization system 170 may receive actual account information 268 from token redemption module 264, and may perform operations that incorporate portions of actual account information 268 into authorization request 216, e.g., to generate an augmented authorization request 272, and to provide augmented authorization request 272 as an input to routing module 250. As described herein, routing module 250 may perform operations that transmits the augmented authorization request across network 120 to issuer system 160, e.g., through an authorization API 274 maintained by a local authorization module 276 of the issuer system 160. In some instances, authorization API 274 may facilitate secure, module-to-module communication between routing module 250 and local authorization module 276 across network 120.

Local authorization decision module 276 may receive augmented authorization request 272 from authorization API 274, and may process augmented authorization request 272 to extract, among other things, the transaction value that characterizes the initiated transaction (e.g., $50.00) and account data that characterizes the originator payment instrument (e.g., the account number, expiration data, and/or card verification value of the originator payment instrument). Further, local authorization decision module 276 may also access stored data that characterizes a current account status of one or more payment instruments issued by the financial institution that maintains issuer system 160 (e.g., within customer account data 162), and load one or more data records 277 of customer account data 162 that characterize the current status of the selected payment instrument.

Data records 277 may specify, among other things, a current account status of the originator payment instrument (e.g., whether the account is delinquent), a current account balance of the originator payment instrument, a credit limit established for the originator payment instrument, and/or values of other account parameters that characterize the originator payment instrument. In some instances, as described herein, local authorization decision module 276 may determine whether to authorize the initiated transaction using the originator payment instrument based the extracted transaction amount, the extracted account data that characterizes the originator payment instrument, and/or the current account status data, and generate decision data 278 indicative of the detection to authorize, or alternatively, decline, the initiated transaction using the originator payment instrument.

For example, an in response to a decision to authorize the initiated transaction using the originator payment instrument, local authorization decision module 276 may generate an authorization code, and package the generated authorization code and data that characterizes the authorized purchase transaction (such as the authorized transaction amount, the parties to the authorized transaction, etc.) into decision data 278. In other examples, and in response to a decision to the decline the initiated transaction (e.g., when the transaction amount would increase the account balance of the originator payment instrument above the credit limit, etc.), local authorization decision module 276 may generate a code or other data indicative of the declined transaction, and incorporate the generated code or other data into decision data 278, along with additional or alternate data characterizing the declined transaction.

In some aspects, local authorization decision module 276 may provide decision data 278 as an input to a response generation module 280. Response generation module 280 may perform operations that package all or a portion of decision data 278 into a confirmation message 282 indicative of the authorized or declined status of the initiated transaction. Response generation module 280 may further provide confirmation message 282 an as input to a routing module 283, which perform operations that transmits confirmation message 282 across network 120 to tokenization system 170, as described below in reference to FIG. 2C.

Figure 2C:
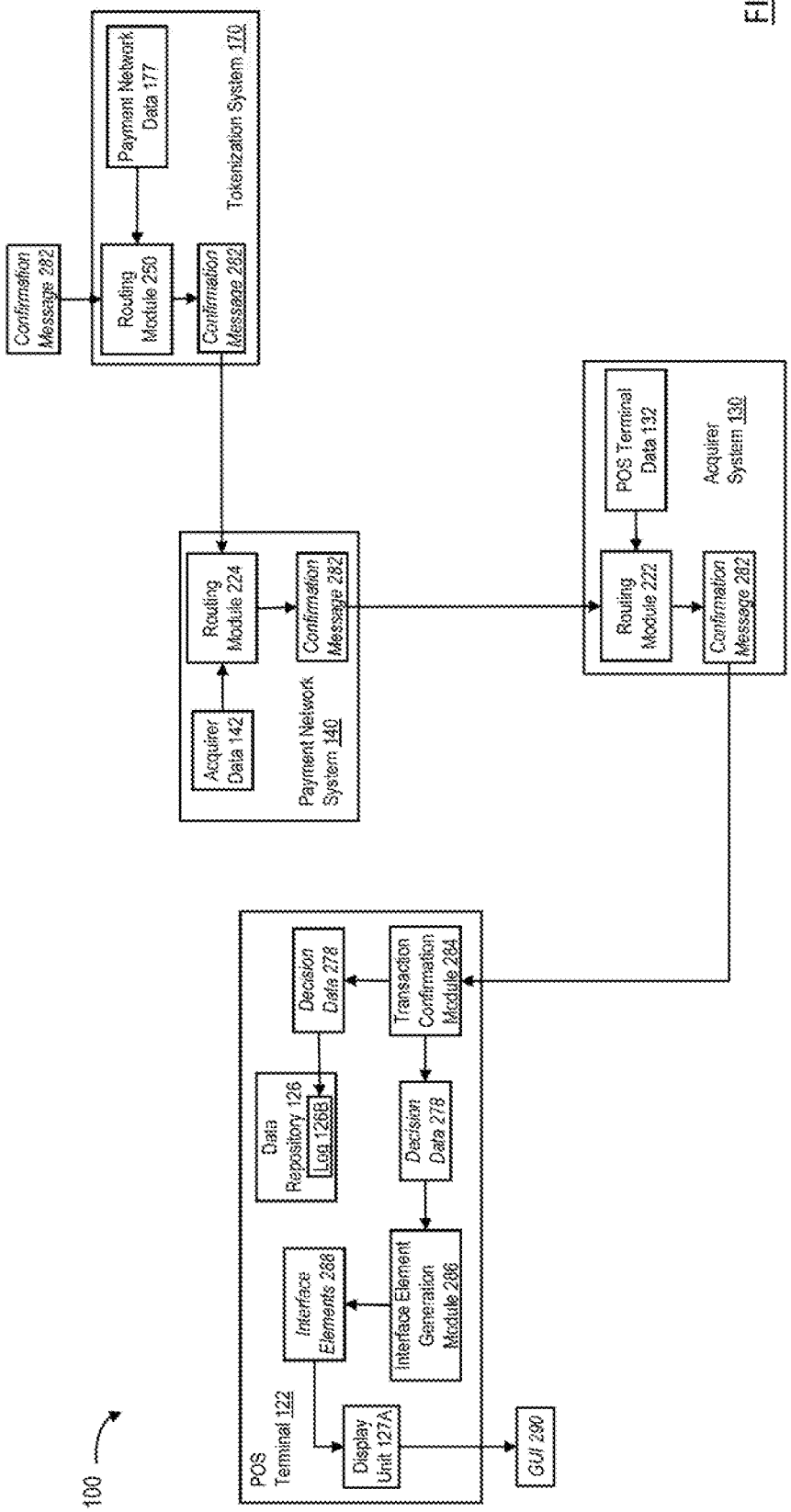

Referring to FIG. 2C, tokenization system 170 may receive confirmation message 282 through a corresponding programmatic interface, such as an API (not illustrated in FIG. 2C), and routing module 250 may access and load a unique identifier (e.g., an IP address, etc.) of payment network system 140 from a tangible, non-transitory memory (e.g., from payment network data 177). Routing module 250 may perform further operations that transmit confirmation message 282 across network 120 to the identifier of payment network system 140 using any of the communications protocols described herein.

Routing module 224 of payment network system 140 may receive confirmation message 282 from the tokenization system 170 (e.g., through a corresponding programmatic interface or API), and may transmit confirmation message 282 to acquirer system 130 across network 120. Further, routing module 222 of acquirer system 130 may receive confirmation message 282 from payment network system 140, may transmit confirmation message 282 to acquirer system 130 across network 120.

POS terminal 122 may receive confirmation message 282 through communications unit 127C (not depicted in FIG. 2C), and a transaction confirmation module 284 may perform operations that extract decision data 278 from confirmation message 282. In some aspects, decision data 278 may include the authorization code and the additional data that characterizes the authorized transaction (e.g., the authorized transaction amount, the parties to the authorized transaction, etc.), which POS terminal 122 stores within one or more data records of transaction log 126B, along with additional values of transaction parameters, such as, but not limited to, a transaction time and date or a transaction location. In other instances, described herein, decision data 278 may include the generated code and the additional data that characterizes the declined transaction.

Transaction confirmation module 284 may also provide decision data 278 to an interface element generation module 286, which may process decision data 278 to generate one or more interface elements 288. In some aspects, interface element generation module 286 may provide generated interface elements 288 to display unit 127A, which may present interface elements 288 within a graphical user interface (GUI) 290 that identifies the authorization code and confirms the authorization of the initiated transaction. In other instances, interface elements 288 may be representative of the declined transaction, and when rendered for presentation by display unit 127 on GUI 290, interface elements 288 may confirm the declined transaction.

In some embodiments, eligibility confirmation module 240, as executed by the one or more processors or tokenization system 170, may determine that the originator payment instrument is not eligibility to participate in the exemplary delegated approval processes described herein. In other embodiments, as described below in reference to FIG. 3A, eligibility confirmation module 240 may process eligibility confirmation 263 to confirm the eligibility of the originator payment instrument to participate in the exemplary delegated approval processes described herein. In some aspects, and in response to the confirmed eligibility, tokenization system 170 may execute one or more application programs (e.g., a delegated approval module 300 of FIG. 3), which cause tokenization system 170 to perform operations that include, among other things, dynamically modifying a status of the initiated transaction at POS terminal 122 to reflect an initiation of the delegated approval processes, requesting and receiving approval of the initiated transaction from a network-connected device operated by an approving party, and in conjunction with issuer system 160 and POS terminal 122, authorizing the initiated transaction using a payment instrument specified by the approving party when the requested approval occurs within a predetermined temporal interval.

Figure 3A:
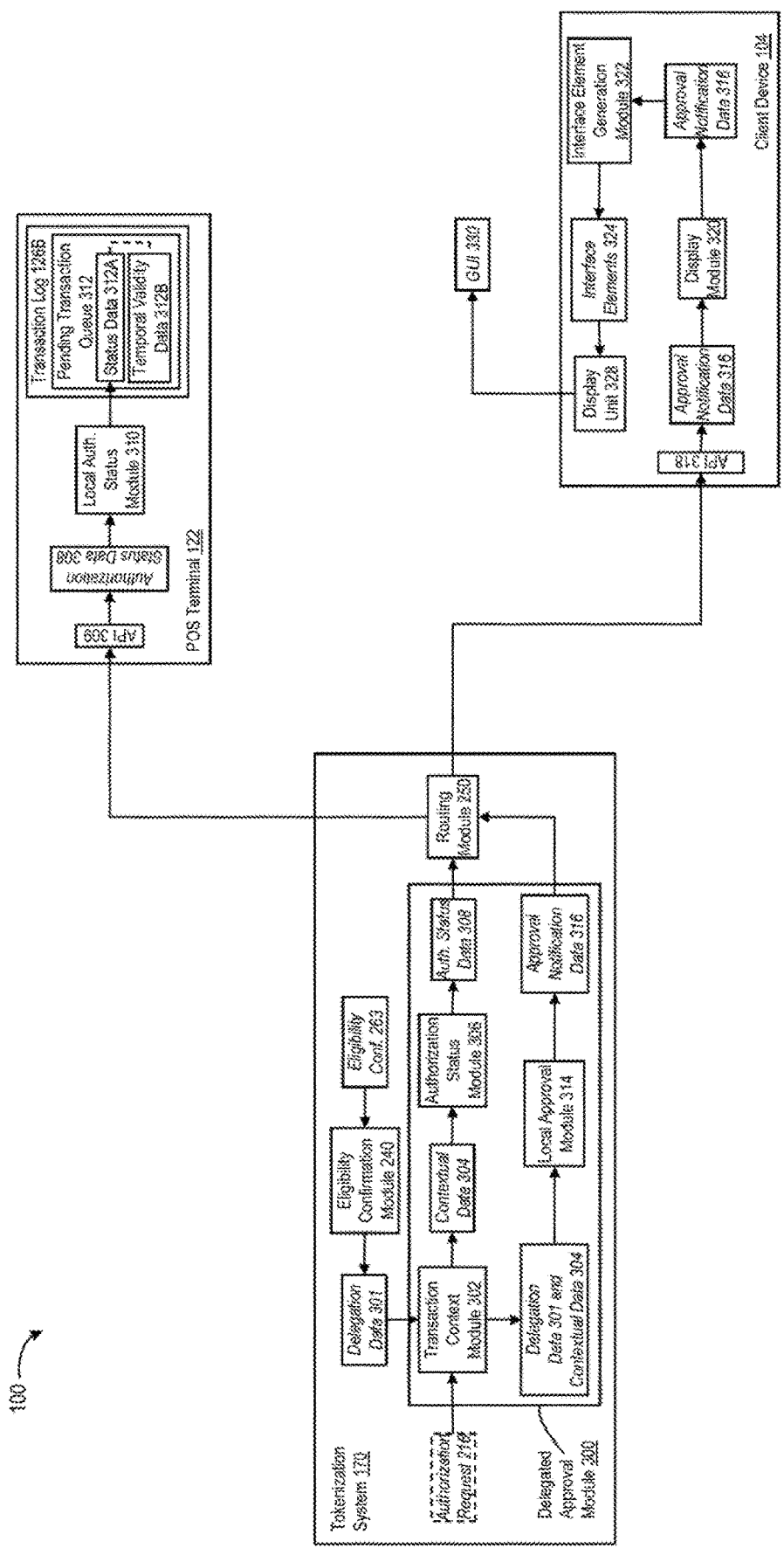

Referring to FIG. 3A, eligibility confirmation module 240 may receive eligibility confirmation 263, and based on a portion of eligibility confirmation 263, determine that the originator payment instrument is eligibility to participate in the exemplary delegated approval processes described herein. In response the determined eligibility of the originator payment instrument, eligibility confirmation module 240 may perform operations that store eligibility confirmation 263 within one or more tangible, non-transitory memories, and further, that extract delegation data 301 from eligibility confirmation 263.

Delegation data 301 may identify, for the originator payment instrument, a unique identifier of a corresponding approving party (e.g., a device identifier of client device 104, as operated by the approving party), contact information and preferences for that approving party (e.g., a preference to receive text messages and a corresponding mobile telephone number), and data identifying an approver payment instrument capable of funding transactions approved by the approving party (e.g., tokenized account information characterizing an available payment instrument, actual account information, etc.). Delegation data 301 may also identify, for the originator payment instrument, a delegation criterion, such as, but not limited to, a threshold transaction amount for an initiated transaction, a transaction velocity condition, or an occurrence of a transaction involving a specified good or service, or involving a specified merchant. As described herein, the delegation criterion, when detected by delegated approval module 300, may trigger an implementation of any of the delegated approval processes described herein.

In some aspects, eligibility confirmation module 240 may provide delegation data 301 as an input to delegated approval module 300 that, when executed by tokenization system 170, perform one or more of the exemplary delegated approval processes described herein. For example, and upon receipt of delegation data 301, a transaction context module 302 of delegated approval module 300 may access the locally stored copy of authorization request 216 and extract, from authorization request 216, contextual data 304 that identifies and characterizes the initiated transaction. Examples of contextual data 304 include, but are not limited to, a transaction reference number generated by POS terminal 122, data identifying the originator payment instrument (e.g., tokenized payment data 231), the transaction amount, the transaction date or time, identifiers of POS terminal 122 or merchant 121 (e.g., an IP address of POS terminal 122, or a merchant category code (MCC) of merchant 121), an identifier of acquirer system 130 (e.g., an IP address, etc.), and additional or alternate data that facilitates an approval of the initiated transaction by the approving party.

An authorization status module 306 of delegated approval module 300 may receive contextual data 304 (e.g., as an input from transaction context module 302), and may perform operations that generate authorization status data 308. Authorization status data 308 may, for example, include the transaction reference number of the identified transaction (e.g., as assigned by POS terminal 122) and data characterizing a current authorization status of the initiated transaction (e.g., pending and awaiting delegated approval). Additionally, in some examples, authorization status data 308 may also include information that instructs POS terminal 122 to modify an internal status of the initiated transaction, e.g., within a pending transaction queue, to reflect the current authorization status (e.g., by associated the transaction reference number with a newly introduced "PENDING" status identifier, or a re-used "DECLINED" status identifier). Authorization status module 306 may provide authorization status data 308 as an input to routing module 250, which may perform any of the processes described herein to transmit authorization status data 308 across network 120 to POS terminal 122 (e.g., directly, or through one or more intermediary systems, such as payment network system 140 or acquirer system 130).

As illustrated in FIG. 3A, a local transaction status module 310 of POS terminal 122 may receive authorization status data 308, e.g., through a corresponding programmatic interface, such as an API 309. In some instances, local transaction status module 310 may process authorization status data 308 to identify the transaction reference number, and may access data 312 characterizing a pending transaction queue (e.g., as maintained within transaction log 126B) and identify stored status data 312A associated with the transaction reference number. Local transaction status module 310 may also modify a portion of stored status data 312A to reflect the current authorization status of the initiated transaction, e.g., by establishing a "PENDING" status identifier, or a re-using a "DECLINED" status identifier, as described herein.

Status data 312A may also be associated with temporal validity data 312B, which specifies a temporal period of validity for the modified portion of status data 312A. The temporal validity period may be specified within authorization status data 308, or alternatively, may be established by local transaction status module 310 in accordance with one or more transaction authorization protocols, e.g., EMV transaction protocols. Further, if the current authorization status of the initiated transaction, a specified within status data 312A, were not further modified to reflect an authorization of the initiated transaction within the temporal validity period (e.g., an "APPROVED" status identifier), local transaction status module 310 may purge the transaction reference number and status data 312A from pending transaction queue data 312, and POS terminal 122 may decline the initiated transaction.

As illustrated in FIG. 3A, transaction context module 302 may also provide delegation data 301 and contextual data 304 as inputs to a local approval module 314 of delegated approval module 300. In some examples, local approval module 314 may process delegation data 301 to extract the delegation criterion, and compare portions of contextual data 304 against the delegation criterion to determine whether the initiated transaction, and contextual data 304, trigger a delegated approval of the initiated transaction by the approving party and an authorization of the initiated transaction using the approver payment instrument. As described herein, the delegation criterion may be included as part of the delegation data 186 maintained by the directory system 180, and may be returned with eligibility confirmation 263 from directory system 180 and provided to confirmation module 240. Alternatively, delegated approval module 300 can issue a separate request for the at least one delegation criterion to, for example the directory system 180 or issuer system 160 through an appropriate programmatic interface or API.

For example, and based on the comparison, local approval module 314 may determine that contextual data 304 is consistent with the delegation criteria (e.g., the transaction amount is less than a threshold transaction amount that would trigger a requirement for approval by the approving party), and as such, that no delegated approval of the initiated transaction is triggered by contextual data 304. In some aspects, not depicted in FIG. 3A, tokenization system 170 and issuer system 160 may perform any of the exemplary authorization processes described herein to authorize the initiated transaction using the originator payment instrument (e.g., as maintained within locally stored authorization request 216) or the approver payment instrument (e.g., as included within delegation data 301) without delegating the approval of the authorization process to the approving party.

In other aspects, if local approval module 314 were to determine an inconsistency between contextual data 304 and the at least one delegation criterion (e.g., the transaction amount exceeds the threshold transaction amount that would trigger an approval by the approving party), then local approval module 314 may generate and output approval notification data 316 that includes portions of contextual data 304 (e.g., that characterize the initiated transaction) along with portions of delegation data 301 that characterize the approving party or a device operated by the approving party. For example, the approving party may correspond to user 103 of client device 104, and the incorporated portions of delegation data 301 may include, but are not limited to, a communications preference of user 103 (such as text-message-based communications), a mobile number assigned to client device 104, or an IP address of client device 104. Further, in some aspects, local approval module 314 may include, within approval notification data 316, additional elements of digital content that prompt the approving party to approve the authorization of the initiated transaction using the approver payment instrument.

Delegated approval module 300 may, in some instances, provide approval notification data 316 as an input to routing module 250, which may perform any of the exemplary processes described herein to transmit approval notification data 316 across the network 120 to client device 104 operated by the approving party (e.g., user 103). A display module 320 of client device 104 may receive approval notification data 316 through a corresponding programmatic interface, e.g., API 318, which facilitates secure, module-to-module communications between routing module 250 and display module 320. In some aspects, an interface element generation module 322 of client device 104 may receive approval notification data 316 from display module 320, and interface element generation module 322 may generate, and provide to a display unit 326, interface elements 324 representative of portions of approval notification data 316.

Display unit 328 may perform operations that render interface elements 324 for presentation within a corresponding interface, such as GUI 330. In some aspects, display module 320 and/or GUI 330 may be associated with an application program executed by client device 104, such as a mobile payment application associated with issuer system 160, a mobile delegated approval application associated with delegated approval module 300, or a mobile communications application consistent with the communications preferences of user 103, e.g., a text-messaging application.

For example, the initiated transaction may correspond to a purchase, by user 101, of a sweater from a Washington, D.C., location of Nordstrom™ on Nov. 30, 2017. The transaction amount associated with the corresponding transaction (e.g., as specified within portions of contextual data 304) may be $50.00, and the payment instrument supplied by client device 102 to POS terminal 122 (e.g., the originator payment instrument) may correspond to a Visa™ credit card. Additionally, the approving party associated with the originator payment instrument may request text-message-based communications, and be associated with an American Express™ credit card (e.g., the approver payment instrument) capable of funding transactions initiated using the originator payment instrument. In some examples, described below in reference to FIG. 3B, approval notification data 316 may include textual content prompting the approving party to approve the authorization of the initiated transaction in the amount of $50.00 using the approver payment instrument, e.g., the American Express™ credit card, and interface element generation module 322 may generate interface elements 324 that represent the textual content and include additional selectable icons that prompt the approving party to approve or disapprove the authorization of the initiated transaction.

Figure 3B:
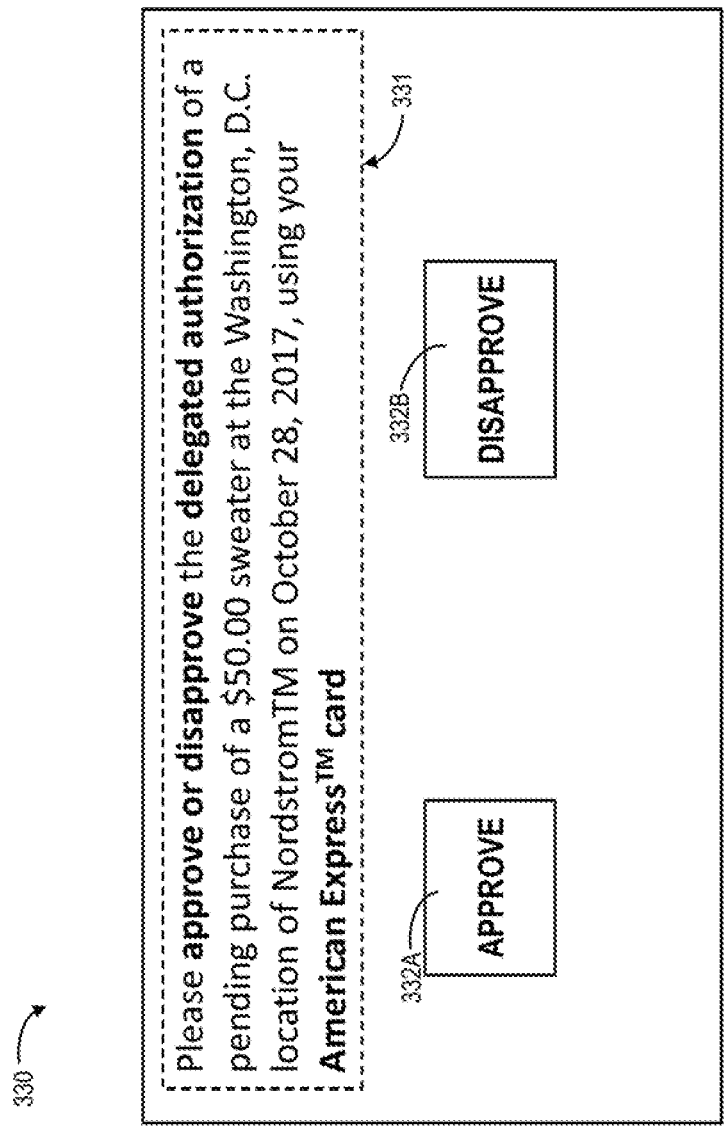
FIG. 3B is a schematic diagram of an exemplary graphical user interface, consistent with the disclosed embodiments.

As illustrated in FIG. 3B, GUI 330 displays textual content 331, which identifies the initiated transaction (e.g., the purchase of the $50.00 sweater from the Washington, D.C., location of Nordstom™ on November $30^{th}$) and the approver payment instrument (e.g., the American Express™ credit card) and further, which prompts the approving party (e.g. user 103) to approve an authorization of the initiated transaction using the approver payment instrument. Further, GUI 330 may also present interface elements establishing a selectable approval icon 332A and selectable disapproval icon 332B. In some aspects, user 103 can either approve the authorization of the initiated transaction, e.g., by providing input to a corresponding input unit of client device 104 that selects icon 332A, or disapprove the authorization of the initiated transaction, providing input to a corresponding input unit of client device 104 that selects icon 332B.

Figure 3C:
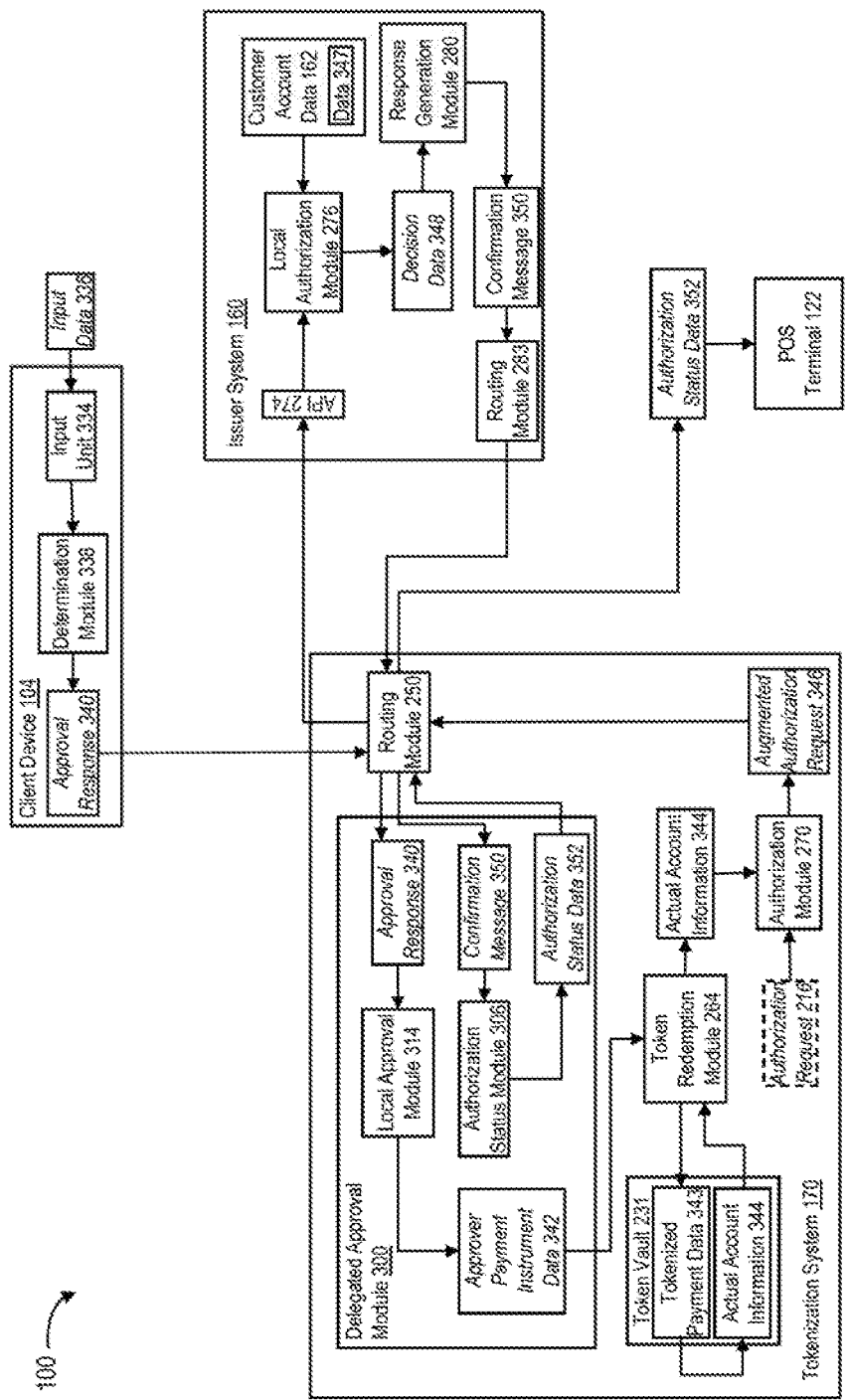
FIG. 3C is a diagram of another portion of an exemplary computing environment, consistent with the disclosed embodiments.

Referring to FIG. 3C, an input unit 334 of client device 104 may receive input data 336 (e.g., corresponding to a selection of icon 332A or 332B within GUI 330), and a determination module 338 of client device 104 may receive and process input data 336 to generate an approval response 340 for transmission back to the tokenization system 170 across network 120. In some instances, approval response 340 may include data specify an approval status of the initiated transaction (e.g., corresponding the input data 336), along with additional data identifying user 101 (e.g., the approving party) or client device 104 (e.g., the assigned mobile telephone number, the IP address, etc.).

Delegated approval module 300 of tokenization system 170 receives approval response 340, e.g., via routing module 250 through a corresponding programmatic interface or API (not shown in FIG. 3C). Local approval module 314 may receive and process approval response 340 to determine whether the approving party (e.g., user 103) approved the initiated transaction for funding using the approver payment instrument (e.g., the American Express™ credit card). For example, if local approval module 314 were to establish that the approving party failed to approve the authorization of the initiated transaction using the approver payment instrument (e.g., user 103 selected icon 332B in FIG. 3B), local approval module 314 may generate and provide output data indicative of the failed approval to authorization status module 306, which may generate and transmit additional status data confirming the failed approval across network 120 to POS terminal 122 (not illustrated in FIG. 3C). In response to the additional status data confirming the failed approval, POS terminal 122 may perform any of the processes described herein to local transaction status module 310 may purge the transaction reference number and status data 312A from pending transaction queue data 312, and POS terminal 122 may decline the initiated transaction (also not illustrated in FIG. 3C).

Alternatively, if local approval module 314 were to determine from approval response 340 that the approving party approved authorization of the initiated transaction, tokenization system 170 and issuer system 160 collectively perform any of the exemplary processes described herein to authorize and fund the initiated transaction using the approver payment instrument, e.g., the American Express™ card held by user 103. For example, local approval module 314 may process delegation data 301 to extract provide data 342 characterizing the approver payment instrument, and provide approver payment instrument data 342 as an input to token redemption module 264.

Token redemption module 264 may extract tokenized payment data 343 from approver payment instrument data 342, and access and load, from token vault 174, actual account information 344 associated with tokenized payment data 343. Authorization module 270 may receive actual account information 344 from token redemption module 264, and may perform operations that incorporate actual account information 344 and portions of locally stored authorization request 216 (e.g., the transaction amount, the transaction date or time, and other information characterizing the initiated transaction) into an augmented authorization request 346, which routing module 250 may transmit across network 120 to issuer system 160, e.g., through an authorization API 274. Local authorization decision module 276 may receive augmented authorization request 272 from authorization API 274, and may perform any of the processes described above to authorize (or decline) the initiated transaction using the approver payment instrument (e.g., based on a comparison of portions of augmented authorization request 346 and corresponding portions 347 of customer account data 162), and to generate decision data 348 that confirms the decision to authorize or decline the initiated transaction using the approver payment instrument.

Local authorization decision module 276 may provide decision data 348 as an input to a response generation module 280, which perform any of the exemplary processes described herein to package all or a portion of decision data 348 into a confirmation message 350 indicative of the authorized or declined status of the initiated transaction. Response generation module 280 may further provide confirmation message 350 an as input to a routing module 283, which perform operations that transmits confirmation message 350 across network 120 to tokenization system 170.

As illustrated in FIG. 3C, delegation approval module 300 of tokenization system 170 may receive confirmation message 350 through a corresponding programmatic interface, such as an API (not illustrated in FIG. 3C), and routing module 250 may provide confirmation data 35. As an input to authorization status module 306. Based on portions of confirmation message 350, authorization status module 306 may generate authorization status data 352 consistent with the decision to authorize or decline the initiated transaction using the approver payment instrument (e.g., as indicated in decision data 348). As described herein, authorization status data 352 may include the transaction reference number of the identified transaction (e.g., as assigned by POS terminal 122) and data characterizing a current authorization status of the initiated transaction (e.g., authorized or declined). Additionally, in some examples, authorization status data 308 may also include information that instructs POS terminal 122 to modify an internal status of the initiated transaction, e.g., within a pending transaction queue, to reflect the current authorization status.

Authorization status module 306 may provide authorization status data 352 as an input to routing module 250, which may perform any of the processes described herein to transmit authorization status data 352 across network 120 to POS terminal 122 (e.g., directly, or through one or more intermediary systems, such as payment network system 140 or acquirer system 130). In some instances, tokenization system 170 may "push" authorization status data 352 (and similarly generated authorization status data) to the POS terminal 122 upon generation or at regular intervals. In alternative instances, the POS terminal 122 may pull updated authorization status data from the tokenization system 170.

In some aspects, POS terminal 122 may receive authorization status data 352, and may perform any of the exemplary processes described above to the transaction status data maintained within the pending transaction queue to reflect the current authorization status of the initiated transaction, e.g., authorized or declined. For example, issuer system 160 may elect to decline the initiated transaction using the approver payment instrument, and authorization status data 352 may include information that instructs POS terminal 122 to purge the transaction reference number and the transaction status data associated with the initiated transaction. POS terminal 122 may decline the initiated transaction, and withhold the good or service involved in the transaction.

In other examples, issuer system 160 may elect to authorize the initiated transaction using the approver payment instrument, and authorization status data 352 may reflect a current "APPROVED" status of the initiated transaction. If POS terminal 122 were to receive authorization status data 352 within the temporal validity period (e.g., as specified within temporal validity data 312B of FIG. 3A), POS terminal 122 may perform any of the exemplary processes described herein to modify the transaction status data associated with the transaction reference number, and thus, the initiated transaction, to reflect to current "APPROVED" status. Merchant 121 may provide the customer with the food or service involved in the initiated transaction, and POS terminal 122 may purge the transaction reference number and the transaction status data associated with the initiated transaction from the pending transaction queue. Alternatively, if POS terminal 122 were to receive authorization status data 352 outside of the temporal validity period, POS terminal 122 may decline the initiated transaction and purge the transaction reference number and the transaction status data associated with the initiated transaction from the pending transaction queue, as described herein.

In some examples, the data characterizing the approver payment instrument (e.g., approver payment instrument data 342 of FIG. 3C) may include tokenized payment data that masks one or more portions of sensitive account data (e.g., tokenized payment data 343 of FIG. 3C). As illustrated in FIG. 3C, token redemption module 264 may obtain actual account information characterizing tokenized payment data 343, e.g., based on data stored within token vault 174, and tokenization system 170 and issuer system 160 may perform any of the exemplary processes described herein to authorize the funding of the initiated transaction using the approver payment instrument.

In other examples, approver payment instrument data 342 may include the actual account information that characterizes the approver payment instrument (e.g., without tokenization), and local approval module 314 may transmit approver payment instrument data 342 directly to issuer system 160, e.g., across network 120 through authorization API 274. Issuer system 160 may then perform any of the processes described herein to authorize the funding of the initiated transaction using the approver payment instrument, and may provide decision data, e.g., decision data 348, indicative of the corresponding authorization decision to tokenization system 170, as described in FIG. 3C.

Further, and as described above in FIG. 2B, authorization request 216, as generated by POS terminal 122 and as received by payment network system 140, may include tokenized payment data 231 that represents and masks sensitive account data associated with the originator payment instrument. Based on a detected presented of tokenized payment data 231, e.g., by token detection module 264, payment network system 140 may route authorization request 216 across network 120 to tokenization system 170, which, in conjunction with issuer system 160 and directory system 180, perform any of the exemplary processes described herein to delegate an approval of an authorization of an initiated transaction to a third party, e.g., an approving party, and in response to successful approval process, to authorize a funding of the initiated transaction using a payment instrument held by the approving party, e.g., the approver payment instrument.

In other examples, authorization request 216 need not include tokenized payment data 231, and may instead include actual account information that characterizes the originator payment instrument. Based on a determined lack of tokenized payment data, e.g., by token detection module 264, payment network system 140 may bypass tokenization system 170 and route authorization request 216 across network 120 directly to issuer system 160, which performs any of the exemplary processes described herein to delegate the approval of the authorization of the initiated to the approving party, and to authorize the funding of the initiated transaction using the approver payment instrument. For example, issuer system 160 may execute a local eligibility confirmation module that, in conjunction with directory system 180, confirms an eligibility of the originator payment instrument (e.g., the actual account information included within authorization request 216) in the exemplary delegated approval processes described herein. Further, issuer system 160 may also execute a local delegated approval module, and local copies of the constituent application modules that collectively establish the local delegated approval module, that authorizes the initiated transaction using the approver payment instrument.

In some aspects, the local eligibility confirmation module and the local delegated approval module may be structures similarly, and perform functions and processes similar to, corresponding ones of the eligibility confirmation module 240 and delegated approval module 300, as described above. Further, in certain aspects, issuer system 160 may be configured by the executed local delegated approval module to transmit authorization status data to POS terminal 122, and/or approval notification data to client device 104 across network 120 without interaction with, or routing by, tokenization system 170.

Figure 4:
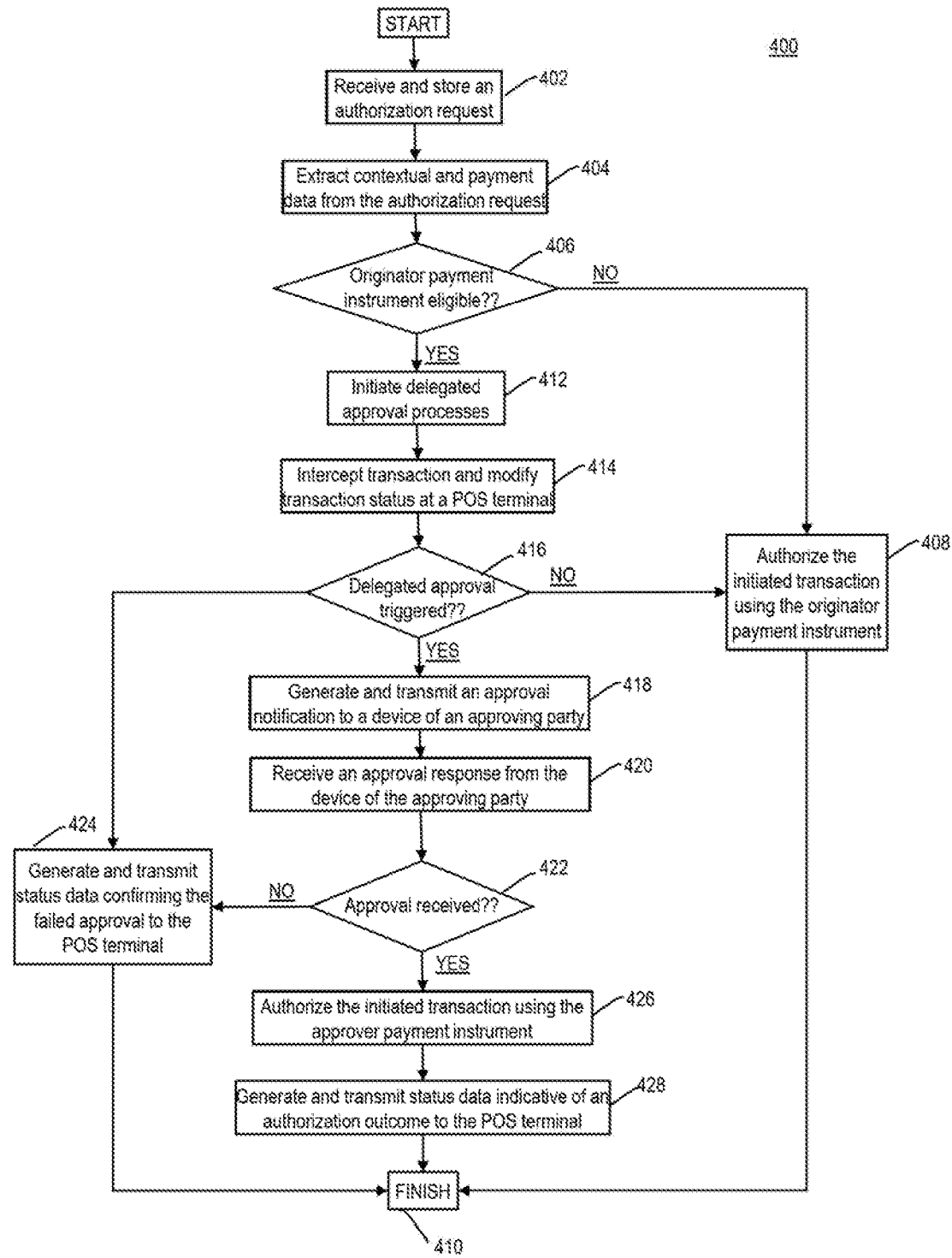
FIG. 4 is a flowchart of exemplary processes for implementing delegating an approval of an initiated data exchange to a network-connected device, in accordance with the disclosed embodiments.

FIG. 4 is a flowchart of an exemplary process 400 for delegating an approval of an initiated data exchange to a third-party device operating within a network environment, in accordance with the disclosed embodiments. In certain aspects, and as described above, the data exchange may facilitate a secure authorization of a transaction initiated at a network-connected device, such as POS terminal 122 of FIG. 1. For example, the initiated transaction may correspond to a purchase transaction in which a customer, e.g., user 101 of FIG. 1 using client device 102 or user 101 of FIG. 1 using transaction card 105, purchases a good or service from a merchant, e.g., merchant 121, at an agreed-upon price (e.g., a transaction amount). Further, as described herein, one or more network-connected systems may perform operations that authorize the initiated data exchange subject to approval data received from an additional network-connected device operated by a designated approving party (e.g., user 103 that operates client device 104). In some examples, issuer system 160, or alternatively, tokenization system 170 may perform the steps of exemplary process 400 (e.g., upon execution of eligibility confirmation module 240, delegated approval module 300, and/or local versions of eligibility confirmation module 240 or delegated approval module 300, as described herein).

Referring to FIG. 4, tokenization system 170 or issuer system 160 may receive an authorization request generated by a network-connected terminal device, e.g., POS terminal 122 of FIG. 1, and store the received authorization request within a portion of a tangible, non-transitory memory (e.g., in step 402). In some aspects, tokenization system 170 or issuer system 160 may process the received authorization data in step 404 to extract contextual data that identifies and characterizes the initiated transaction and payment data that characterizes a payment instrument, e.g., an originator instrument, selected by user 101 to fund the initiated transaction (e.g., in step 404). The contextual data may, for example, include a transaction reference number assigned to the initiated transaction by POS terminal 122, along with values of one or more parameters that characterize the initiated transaction. Examples of these parameter values include, but are not limited to, transaction date or time, an identifier of merchant 121 (e.g., an MCC), or an identifier of a good or service (e.g., a UPC), and the payment data may include tokenized payment data representative of portions of the originator payment instrument and/or actual account information of the originator payment instrument.

Based on portions of the extracted payment data, tokenization system 170 or issuer system 160 may determine the originator payment instrument is eligible to participate in the exemplary delegated approval processes described herein (e.g., in step 406). For example, tokenization system 170 or issuer system 160 may transmit all of a portion of the extracted payment data to directory system 180 (e.g., across network 120 via a corresponding programmatic interface or API), which maintains a directory of payment instruments participating in the exemplary delegated approval processes described herein (e.g., within eligible payment instrument database 182 of FIG. 1). Directory system 180 may perform any of the exemplary processes described above to query the eligible payment instrument database 182 and obtain eligibility data characterizing the eligibility of the originator payment instrument (e.g., eligible to participate or ineligible to participate).

In some instances, if the originator payment instrument were eligible for participation in the exemplary delegated approved processes, directory system 180 may also extract, from eligible payment instrument database 182, the delegation data that includes, for the originator payment instrument, a unique identifier of a third party capable of approving transactions initiated using the originator payment (e.g., an approving party), contact information and preferences for that approving party (e.g., a preference to receive text messages and a corresponding mobile telephone number), and data identifying a payment instrument capable of funding an initiated transaction approved by the approving party (e.g., tokenized or actual account information characterizing an approver payment instrument). Further, and as described herein, the delegation data may also include, for the originator payment instrument, at least one delegation criterion that, when detected by issuer system 160 or tokenization system 170, triggers an implementation of any of the delegated payment processes described herein. Examples of delegation criteria include, but are not limited to, a threshold transaction amount for an initiated transaction, a transaction velocity condition, ranges of transaction dates or times or an occurrence of a transaction involving a specified good or service, or involving a specified merchant. The delegation criteria could also be tied to the absence of a specific criterion, such as the threshold transaction amount, which would trigger delegation for every initiated transaction.

Directory system 180 may package portions of the eligibility data, and additionally or alternatively, portion of the delegation data, into an eligibility confirmation, which directory system 180 may transmit across network 120 to tokenization system 170 or issuer system 160, e.g., through a corresponding programmatic interface or API. Tokenization system 170 or issuer system 160 may receive the eligibility request, and based on portions of the eligibility data, determine in step 406 an eligibility of the originator payment instrument to participate in the exemplary delegated approval processes described herein.

For example, if tokenization system 170 or issuer system 160 were to determine that the originator payment instrument is ineligible to participate in the exemplary delegated approval processes (e.g., step 406; NO), tokenization system 170 or issuer system 160 may perform any of the exemplary processes described herein to authorize the initiated transaction using the initiator payment instrument (e.g., in step 408). Exemplary process 400 may then be complete in step 410.

Alternatively, if tokenization system 170 or issuer system 160 were to determine that the originator payment instrument is eligible to participate in the exemplary delegated approval processes (e.g., step 406; YES), tokenization system 170 or issuer system 160 may perform initiate a delegated approval of the authorization of the initiated transaction to the approving party (e.g., in step 412). In some aspects, tokenization system 170 or issuer system 160 may perform any of the exemplary processes described herein to establish a current authorization status of the initiated transaction (e.g., pending and awaiting delegated approval), and to generate and transmit, to POS terminal 122, authorization status data that instructs POS terminal 122 to modify an internal status of the initiated transaction, e.g., within a pending transaction queue, to reflect the current authorization status (e.g., in step 414). For example, the authorization status data may include a transaction reference number assigned to the initiated transaction by POS terminal 122, and may instruct POS terminal 122 to perform operations that associate, within the pending transaction queue, the transaction reference number with a newly introduced "PENDING" status identifier, or a re-used "DECLINED" status identifier.

In further aspects, tokenization system 170 or issuer system 160 may perform any of the exemplary processes described herein to determine whether the initiated transaction triggers the delegated approval of the authorization of that initiated transaction by the approving party (e.g., in step 416). In some instances, as described herein, tokenization system 170 or issuer system 160 may compare portions of the contextual data that characterizes the initiated transaction against the at least one delegation criterion to determine an inconsistency, or alternatively, a consistency, between the contextual data and the at least one delegation criterion.

If tokenization system 170 or issuer system 160 were to determine a consistency between the contextual and the at least one delegation criterion (e.g., step 416; NO), the initiated transaction may not trigger any delegated approval by the approving party, and exemplary process 400 may pass back to step 408. Tokenization system 170 or issuer system 160 may perform any of the exemplary processes described herein to authorize the initiated transaction using the originator payment instrument (e.g., in step 408), and exemplary process 400 may then be complete in step 410.

Alternatively, if tokenization system 170 or issuer system 160 were to determine an inconsistency between the contextual and the at least one delegation criterion (e.g., step 416; YES), the initiated transaction may trigger the delegated approval by the approving party. In response to the determined inconsistency, tokenization system 170 or issuer system 160 may perform any of the exemplary processes described herein to generate approval notification data prompting the approving party to approve (or disapprove) the authorization of the initiated transaction using the approver payment instrument, and to transmit the generated approval notification data to a network-connected device associated with the approving party (e.g., in step 418).

Tokenization system 170 or issuer system 160 may receive, from the device of the approving party, an approval response that includes data confirming the approving party's decision (e.g., in step 420). Tokenization system 170 or issuer system 160 may then process the approval response to determine whether the approving party elected to approve or disapprove the authorization of the initiated transaction using the approver payment instrument (e.g., in step 422).

If tokenization system 170 or issuer system 160 were to determine that the approving party failed to approve the authorization of the initiated transaction using the approver payment instrument (e.g., step 422; NO), tokenization system 170 or issuer system 160 may perform any of the exemplary processes described herein to generate and transmit additional status data confirming the failed approval across network 120 to POS terminal 122 (e.g., in step 424). Exemplary process 400 is then complete in step 410.

Alternatively, if tokenization system 170 or issuer system 160 were to determine that the approving party approves the authorization of the initiated transaction using the approver payment instrument (e.g., step 422; YES), tokenization system 170 or issuer system 160 may perform any of the exemplary processes described herein to authorize the initiated transaction using the approver payment instrument (e.g., in step 426), and to generate and transmit additional status data indicative of the outcome of the authorization using the approver payment instrument across network 120 to POS terminal 122 (e.g., in step 428). Exemplary process 400 is then complete in step 410.

III. Exemplary Hardware and Software Implementations

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification, including payment module 202, transaction initiation module 210, authorization request module 212, routing module 218, 220, 222, 250, and 283, token detection module 224, initiation module 230, eligibility confirmation module 240, query module 262, token redemption module 264, authorization module 270, local authorization module 276, response generation module 280, transaction confirmation module 284, interface element generation module 286, delegated approval module 300, transaction context module 302, authorization status module 306, local authorization status module 310, local approval module 314, display module 320, interface element generation module 322, determination module 338, and other application module described herein, can be implemented as one or more computer programs, i.e., one or more modules of computer program instructions encoded on a tangible non-transitory program carrier for execution by, or to control the operation of, a data processing apparatus (or a computing system). Additionally, or alternatively, the program instructions can be encoded on an artificially-generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including by way of example a programmable processor, a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks;

magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a client computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:
a communications unit;
a memory storing instructions; and
at least one processor coupled to the communications unit and to the memory, the at least one processor being configured to execute the instructions to:
receive, from a terminal device via the communications unit, a request to authorize a transaction initiated by a first device and involving a first data type, the request comprising transaction data that characterizes the transaction;
when the transaction data is inconsistent with a delegation criterion associated with the first data type, transmit, via the communications unit, notification data to a second device and to the terminal device, the notification data comprising at least a portion of the transaction data and an identifier of a second data type associated with the second device, and the notification data instructing an application program executed by the terminal device to access a transaction queue and modify queued data associated with the transaction in accordance with the notification data;
receive, via the communications unit, response data from the second first device that indicates a delegated approval of the transaction using the second data type; and
based on the delegated approval, perform operations that execute the transaction using the second data type and in accordance with the transaction data, and transmit, to the terminal device via the communications unit, status data reflecting the execution of the transaction, the status data instructing the application program executed by the terminal device to modify a portion of a digital interface to reflect the executed transaction, and to delete the modified queued data from the transaction queue based on the execution of the transaction.

2. The apparatus of claim 1, wherein the status data reflects the execution of the transaction using the second data type and in accordance with the transaction data.

3. The apparatus of claim 2, wherein; the at least one processor is further configured to execute the instructions to transmit the notification data to the first device via the communications unit, the notification data instructing an additional application program executed by the first device to present a representation of the portion of the transaction data and the identifier of the second data type on an additional digital interface.

4. The apparatus of claim 3, wherein; the notification data further instructs the application program executed by the terminal device to identify the queued data within the transaction queue associated with the transaction, the modified queued data reflecting a pending authorization of the transaction using the second data type.

5. The apparatus of claim 1, wherein: the notification data instructs the application program executed by the terminal device to present, within the portion of the digital interface, a representation of a pending authorization of the transaction using the second data type; and the status data further instructs the application program executed by the terminal device to modify the portion of the digital interface to reflect an authorization of the transaction using the second data type and in accordance with the transaction data.

6. The apparatus of claim 1, wherein the at least one processor is further configured to execute the instructions to access and load delegation data from the memory, the delegation data identifying the delegation criterion, and the delegation criterion being associated with the delegated approval of the transaction by the second device.

7. The apparatus of claim 1, wherein the at least one processor is further configured to execute the instructions to:
determine that the transaction data is inconsistent with the delegation criterion; and
generate the notification data based on the determination that the transaction data is inconsistent with the delegation criterion.

8. The apparatus of claim 1, wherein:
the transaction data comprises a value of a parameter that characterizes the transaction;
the delegation criterion identifies a threshold value of the parameter; and
the at least one processor is further configured to execute the instructions to:
determine that the parameter value exceeds the threshold value; and
based on the determination that the parameter value exceeds the threshold value, transmit the notification data to at least one of the first device or the terminal device via the communications unit.

9. The apparatus of claim 1, wherein:
the first device initiates the transaction at the terminal device, the first device being associated with the first data type, and the terminal device being in communication with the first device; and
the at least one processor is configured to receive the request from the terminal device.

10. The apparatus of claim 1, wherein:
the transaction comprises a purchase transaction;
the first data type comprises a first payment instrument, and the second data type comprises a second payment instrument;
the transaction data comprises a value of a parameter of the purchase transaction; and
the at least one processor is further configured to execute the instructions to determine that the parameter value of the purchase transaction is inconsistent with the delegation criterion.

11. The apparatus of claim 1, wherein:
the modified queued data reflects a pending authorization of the transaction using the second data type, and the transaction queue associates the modified queued data with temporal data, the temporal data specifying a temporal period of validity of the pending authorization;
the notification data further causes the application program executed by the terminal device to detect an expiration of the temporal period of validity of the pending authorization and, based on the expiration of the temporal period of validity, delete the modified queued data and the temporal data from the transaction queue.

12. A computer-implemented method, comprising:
receiving, using at least one processor, a request from a terminal device to authorize a transaction initiated by a first device and involving a first data type, the request comprising transaction data that characterizes the transaction;
when the transaction data is inconsistent with a delegation criterion associated with the first data type, transmitting, using the at least one processor, notification data to a second device and to the terminal device, the notification data comprising at least a portion of the transaction data and an identifier of a second data type associated with the second device, and the notification data instructing an application program executed by the terminal device to access a transaction queue and modify queued data associated with the transaction in accordance with the notification data;
receiving, using the at least one processor, response data from the second first device that indicates a delegated approval of the transaction using the second data type; and
based on the delegated approval, and using the at least one processor, performing operations that execute the transaction using the second data type and in accordance with the transaction data, and transmitting, to a terminal device, status data reflecting the execution of the transaction, the status data instructing an application program executed by the terminal device to modify a portion of a digital interface to reflect the executed transaction, and to delete the modified queued data from the transaction queue based on the execution of the transaction.

13. The computer-implemented method of claim 12, wherein
the status data reflects the execution of the transaction using the second data type and in accordance with the transaction data.

14. The computer-implemented method of claim 13, wherein
transmitting the notification data comprises transmitting the notification data to the first device, the notification data instructing an additional application program executed by the first device to present a representation of the portion of the transaction data and the identifier of the second data type on an additional digital interface.

15. The computer-implemented method of claim 12, wherein:
the notification data instructs the application program executed by the terminal device to present, within the portion of the digital interface, a representation of a pending authorization of the transaction using the second data type; and
the status data further instructs the application program executed by the terminal device to modify the portion of the digital interface to reflect an authorization of the transaction using the second data type and in accordance with the transaction data.

16. The computer-implemented method of claim 12, further comprising accessing and loading, using the at least one processor, delegation data from a data repository, the delegation data identifying the delegation criterion, and the delegation criterion being associated with the delegated approval of the transaction by the second device.

17. The computer-implemented method of claim 12, further comprising:
determining, using the at least one processor, that the transaction data is inconsistent with the delegation criterion; and
generating, using the at least one processor, the notification data based on the determination that the transaction data is inconsistent with the delegation criterion.

18. The computer-implemented method of claim 12, wherein:
the transaction data comprises a value of a parameter that characterizes the transaction;
the delegation criterion identifies a threshold value of the parameter;
the computer-implemented method further comprises determining, using the at least one processor, that the parameter value exceeds the threshold value; and
transmitting the notification data comprises transmitting the notification data to the at least one of the first device or the terminal device based on the determination that the parameter value exceeds the threshold value.

19. The computer-implemented method of claim 12, wherein:
the first device initiates the transaction at the terminal device, the first device being associated with the first data type, and the terminal device being in communication with the first device; and
receiving the request comprises receiving the request from the terminal device.

20. The computer-implemented method of claim 12, wherein:
the transaction comprises a purchase transaction;
the first data type comprises a first payment instrument, and the second data type comprises a second payment instrument;
the transaction data comprises a value of a parameter of the purchase transaction; and
the computer-implemented method further comprises determining, using the at least one processor, that the parameter value of the purchase transaction is inconsistent with the delegation criterion.

21. A tangible, non-transitory computer-readable medium storing instructions that, when executed by at least one processor, cause the at least one processor to perform a method, comprising:
receiving, from a terminal device, a request to authorize a transaction initiated by a first device and involving a first data type, the request comprising transaction data that characterizes the transaction;
when the transaction data is inconsistent with a delegation criterion associated with the first data type, transmitting notification data to a second device and to the terminal device, the notification data comprising at least a portion of the transaction data and an identifier of a second data type associated with the second device, and the notification data instructing an application program executed by the terminal device to access a transaction queue and modify queued data associated with the transaction in accordance with the notification data;
receiving response data from the second device that indicates a delegated approval of the transaction using the second data type; and
based on the delegated approval, performing operations that execute the transaction using the second data type and in accordance with the transaction data, and transmitting, to the terminal device, status data reflecting the execution of the transaction, the status data instructing the application program executed by the terminal device to modify a portion of a digital interface to reflect the executed transaction, and to delete the modified queued data from the transaction queue based on the execution of the transaction.

* * * * *